US012733063B2

(12) United States Patent
Wu

(10) Patent No.: US 12,733,063 B2
(45) Date of Patent: Sep. 8, 2026

(54) MANAGING DATA COMMUNICATION IN A DISTRIBUTED BASE STATION

(71) Applicant: GOOGLE LLC, Mountain View, CA (US)

(72) Inventor: Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 274 days.

(21) Appl. No.: 18/280,552

(22) PCT Filed: Mar. 31, 2022

(86) PCT No.: PCT/US2022/022740

§ 371 (c)(1),
(2) Date: Sep. 6, 2023

(87) PCT Pub. No.: WO2022/212642

PCT Pub. Date: Oct. 6, 2022

(65) Prior Publication Data

US 2024/0155726 A1 May 9, 2024

Related U.S. Application Data

(60) Provisional application No. 63/169,552, filed on Apr. 1, 2021.

(51) Int. Cl.
*H04W 76/27* (2018.01)
*H04W 74/00* (2009.01)
(Continued)

(52) U.S. Cl.
CPC ......... *H04W 76/27* (2018.02); *H04W 74/004* (2013.01); *H04W 74/0833* (2013.01); *H04W 74/0836* (2024.01)

(58) Field of Classification Search
CPC ............... H04W 76/27; H04W 74/004; H04W 74/0833; H04W 74/0836
See application file for complete search history.

(56) References Cited

U.S. PATENT DOCUMENTS 11,363,666 B2 * 6/2022 Wang ...................... H04W 8/04
2018/0359786 A1 * 12/2018 Phuyal ............. H04W 74/0833
(Continued)

FOREIGN PATENT DOCUMENTS

EP 4468645 A2 * 11/2024 ........... H04L 5/0053
WO WO-2020/171369 A1 8/2020
(Continued)

OTHER PUBLICATIONS

"3rd Generation Partnership Project; Technical Specification Group Radio Access Network; NG-RAN; F1 application protocol (F1AP) (Release 16)," 3GPP TS 38.473 (2020).
(Continued)

*Primary Examiner* — Fahmida S Chowdhury
(74) *Attorney, Agent, or Firm* — MARSHALL, GERSTEIN & BORUN LLP

(57) ABSTRACT

A DU and/or a CU of a distributed base station implement the techniques of this disclosure to support early data transmission from a UE operating in an inactive or idle state. In some embodiments, the DU receives (304) a MAC PDU from the UE when the radio connection between the UE and the DU is not active (302). The DU provides (308) the data packet included in the MAC PDU to the CU while preventing (306) the CU from initiating a procedure for resuming the radio connection. In this manner, the base station avoids an unnecessary transition of the UE to the connected state. The CU may then proceed with releasing (312) radio resources or otherwise determining to reactivate the radio connection.

19 Claims, 21 Drawing Sheets

(51) Int. Cl.
*H04W 74/0833* (2024.01)
*H04W 74/0836* (2024.01)

(56) References Cited

U.S. PATENT DOCUMENTS

2019/0132761 A1* 5/2019 Dinan ........................ H04L 5/00
2019/0141515 A1* 5/2019 Kim .................. H04W 52/0216
2020/0045666 A1* 2/2020 Edge ..................... H04W 24/10
2020/0053686 A1* 2/2020 Edge ..................... H04W 60/04
2020/0187245 A1* 6/2020 Fujishiro ............... H04W 72/21
2021/0022185 A1* 1/2021 Fujishiro ............... H04W 48/20
2021/0022200 A1* 1/2021 Mildh ................... H04W 60/02
2021/0058972 A1* 2/2021 Choe ................... H04W 12/043
2021/0160949 A1* 5/2021 Kim ...................... H04W 76/27
2021/0212074 A1* 7/2021 Yu ......................... H04W 72/53
2021/0259013 A1* 8/2021 Wong .................. H04W 74/004
2021/0259024 A1* 8/2021 Wong .................... H04L 1/1896
2021/0307100 A1* 9/2021 Talebi Fard .......... H04W 76/18
2021/0315050 A1* 10/2021 Rönneke ............... H04W 76/19
2022/0015181 A1* 1/2022 Rönneke ............... H04W 76/27
2022/0039060 A1* 2/2022 Chang ................. H04W 68/005
2022/0167452 A1* 5/2022 Chang ................... H04W 76/19
2022/0174775 A1* 6/2022 Rönneke ............... H04W 76/27
2022/0279345 A1* 9/2022 Kim .................... H04W 12/106
2022/0279391 A1* 9/2022 Bae ................... H04W 36/0033
2022/0303946 A1* 9/2022 Kim .................... H04W 68/005
2022/0330345 A1* 10/2022 Mangalvedhe ... H04W 74/0833
2023/0067158 A1* 3/2023 Kim ...................... H04W 76/16
2023/0083985 A1* 3/2023 Kim ...................... H04W 76/20
370/329
2023/0156544 A1* 5/2023 Wu ................... H04W 36/0094
370/331
2023/0397259 A1* 12/2023 Lauridsen ........... H04W 72/542
2024/0080928 A1* 3/2024 Yue ....................... H04W 72/21
2024/0155726 A1* 5/2024 Wu ....................... H04W 76/27

FOREIGN PATENT DOCUMENTS

WO WO-2021/045339 A1 3/2021
WO WO-2021/207317 A1 10/2021

OTHER PUBLICATIONS

"5G; NR; Radio Resource Control (RRC); Protocol Specification," 3GPP TS 38.331 version 16.4.1 Release 16 (2021).
"LTE; 5G; W1 Interface; Application Protocol (W1AP)," 3GPP TS 37.473 version 16.3.0 Release 16 (2020).
Rapporteur (ZTE), "Discussion on Support of Small Data Transmission in Inactive State," 3GPP Draft (Jan. 15, 2021).
"3rd Generation Partnership Project; Technical Specification Group Radio Access Network; NR; Study of Integrated Access and Backhaul; (Release 16)," 3GPP Draft (Jan. 11, 2019).
International Search Report and Written Opinion for Application No. PCT/US2022/022740, dated Sep. 14, 2022.
3GPP TSG-RAN WG3 #114-e, "SoD of CB: #SDT2_CGbased", Nov. 2021, 27 pages.

* cited by examiner

MANAGING DATA COMMUNICATION IN A DISTRIBUTED BASE STATION

FIELD OF THE DISCLOSURE

This disclosure relates generally to wireless communications and, more particularly, to communication of uplink and/or downlink data at a user equipment (UE) when the UE operates in an inactive or idle state associated with a protocol for controlling radio resources.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally speaking, a base station operating a cellular radio access network (RAN) communicates with a user equipment (UE) using a certain radio access technology (RAT) and multiple layers of a protocol stack. For example, the physical layer (PHY) of a RAT provides transport channels to the Medium Access Control (MAC) sublayer, which in turn provides logical channels to the Radio Link Control (RLC) sublayer, and the RLC sublayer in turn provides data transfer services to the Packet Data Convergence Protocol (PDCP) sublayer. The Radio Resource Control (RRC) sublayer is disposed above the PDCP sublayer.

The RRC sublayer specifies the RRC_IDLE state, in which a UE does not have an active radio connection with a base station; the RRC_CONNECTED state, in which the UE has an active radio connection with the base station; and the RRC_INACTIVE state to allow a UE to more quickly transition to the RRC_CONNECTED state due to Radio Access Network (RAN)-level base station coordination and RAN-paging procedures. In some cases, the UE in the RRC_IDLE or RRC_INACTIVE state has only one, relatively small packet to transmit. In these cases, the UE in the RRC_IDLE or RRC_INACTIVE state can perform an early data transmission (EDT) (also referred to as small data transmission) without transitioning to the RRC_CONNECTED state.

However, when a base station is implemented in a distributed manner, it is not clear how a central unit (CU) and a distributed unit (DU) should support early data communication with a UE. For example, it is not clear how the DU or CU should prevent the UE from transitioning to the connected state upon initiating early data transmission via a distributed base station. Further, when the CU has multiple downlink data packets to transmit to the UE operating in the inactive state or idle state, there is no connection for the CU to send these data packets to the DU.

SUMMARY

A DU and/or a CU of a distributed base station implement the techniques of this disclosure to support early data transmission from a UE operating in an inactive or idle state. In an example scenario, the DU receives a MAC PDU from the UE when the radio connection between the UE and the DU is not active. The DU provides the data packet included in the MAC PDU to the CU but does not transmit a radio configuration to the CU, so as to prevent the CU from initiating a procedure for resuming the radio connection. In this manner, the base station avoids an unnecessary transition of the UE to the connected state. In another implementation, the DU provides the radio configuration to the CU, but the CU ignores (or discards) the radio configuration.

The DU can determine whether it should exclude the radio configuration based on factors such as the current state of the radio connection between the DU and the CU (e.g., active or suspended); presence or absence of an EDT indicator; the type of the RRC message included in the MAC PDU (e.g., a request to set up a new RRC connection, a request to resume a suspended RRC connection); and whether a MAC PDU frame includes both an RRC message and at least a portion of an uplink data packet.

Depending on the implementation or scenario, the DU transmits the RRC message and the uplink data packet to the CU via a control-plane interface or a user-plane interface. Further, in some cases, the DU assembles multiple segments of an uplink data packet prior to transmitting the uplink data packet to the CU.

A CU in some cases transmits downlink data to the UE during the EDT procedure. The downlink data can include a single downlink data packet or multiple data packets, and one or more of the downlink data packets can be segmented.

More generally, a CU of this disclosure in some cases can determine that it should refrain from applying, and transmitting to a UE, a radio configuration for the UE, and/or refrain from performing a procedure for setting up a context for the UE, with a DU. The CU can determine that the UE in these cases does not yet require an active radio connection. In addition to early data transmission, these cases include RNA update for example.

One example embodiment of these techniques is a method, in a distributed unit (DU) of a distributed base station, for managing early data transmission (EDT) from a UE. The method includes receiving, by processing hardware and when a radio connection between the UE and the DU is not active, an uplink data packet from the UE, and transmitting, by the processing hardware, the uplink data packet to the central unit (CU) of the distributed base station, while preventing the CU from activating the radio connection in response to the uplink data packet.

Another example embodiment of these techniques is a method, in a central unit (CU) of a distributed base station, for managing data transmission from a UE. The method includes receiving, by processing hardware from a DU, a transfer message including (i) an uplink message associated with a protocol for controlling radio resources and related to a UE, and (ii) an uplink data packet from the UE; processing, by the processing hardware, the uplink data packet; and determining, based on the transfer message, to refrain from at least one of: transmitting, to the UE, a radio configuration received from the DU, or performing a context setup procedure for the UE.

Still another example embodiment of these techniques is a method, in a CU of a distributed base station, for managing a radio connection between the UE and the DU of the distributed base station. The method includes receiving, from the DU, a transfer message including (i) an uplink message associated with a protocol for controlling radio resources and related to a UE, and (ii) a radio configuration for the UE. In a first instance, in response to determining that the uplink message is a request to setup a new radio connection between the UE and the DU, the method includes configuring the new radio connection using the received radio configuration. In a second instance, in response to determining that the uplink message is not a request to setup a new radio connection between the UE and the DU, the method includes discarding the received radio configuration.

A still further example embodiment of these techniques is a network node with processing hardware and configured to implement a method according to the above.

DETAILED DESCRIPTION OF THE DRAWINGS

As discussed in more detail below, a network node of this disclosure supports early data communication between a UE and a distributed base station, in a manner that prevents the UE from unnecessarily transitioning to a connected state. Some of these techniques also apply to non-early data transmission, as further discussed below.

Figure 1A:
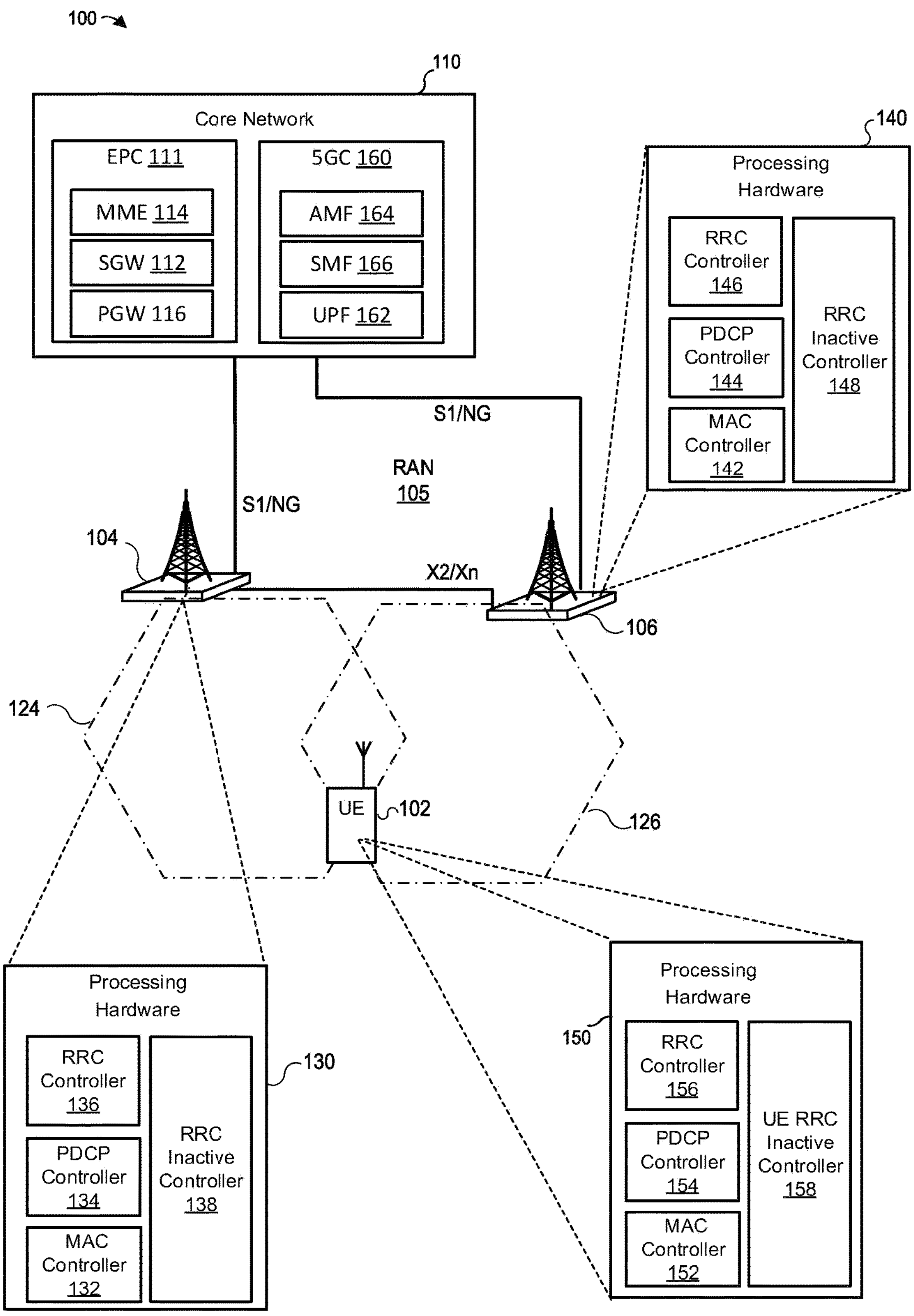
FIG. 1A is a block diagram of an example system in which a base station and/or a user equipment (UE) can implement the techniques of this disclosure for managing early data transmission between the UE and a radio access network (RAN)

Referring first to FIG. 1A, an example wireless communication system 100 includes a UE 102, a base station (BS) 104, a base station 106, and a core network (CN) 110. The base stations 104 and 106 can operate in a RAN 105 connected to the core network (CN) 110. The CN 110 can be implemented as an evolved packet core (EPC) 111 or a fifth generation (5G) core (5GC) 160, for example. The CN 110 can also be implemented as a sixth generation (6G) core in another example.

The base station 104 covers a cell 124, and the base station 106 covers a cell 126. If the base station 104 is a gNB, the cell 124 is an NR cell. If the base station 124 is an ng-eNB, the cell 124 is an evolved universal terrestrial radio access (E-UTRA) cell. Similarly, if the base station 106 is a gNB, the cell 126 is an NR cell, and if the base station 106 is an ng-eNB, the cell 126 is an E-UTRA cell. The cells 124 and 126 can be in the same Radio Access Network Notification Areas (RNA) or different RNAs. In general, the RAN 105 can include any number of base stations, and each of the base stations can cover one, two, three, or any other suitable number of cells. The UE 102 can support at least a 5G NR (or simply, "NR") or E-UTRA air interface to communicate with the base stations 104 and 106. Each of the base stations 104, 106 can connect to the CN 110 via an interface (e.g., S1 or NG interface). The base stations 104 and 106 also can be interconnected via an interface (e.g., X2 or Xn interface) for interconnecting NG RAN nodes.

Among other components, the EPC 111 can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 provides connectivity from the UE to one or more external packet data networks, e.g., an Internet network and/or an Internet Protocol (IP) Multimedia Subsystem (IMS) network. The 5GC 160 includes a User Plane Function (UPF) 162 and an Access and Mobility Management Function (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104 supports a cell 124, and the base station 106 supports a cell 126. The cells 124 and 126 can partially overlap, so that the UE 102 can select, reselect, or hand over from one of the cells 124 and 126 to the other. To directly exchange messages or information, the base station 104 and base station 106 can support an X2 or Xn interface. In general, the CN 110 can connect to any suitable number of base stations supporting NR cells and/or EUTRA cells.

As discussed in detail below, the UE 102 and/or the RAN 105 of this disclosure reduces latency in uplink transmission of data when the radio connection between the UE 102 and the RAN 105 is suspended, e.g., in the inactive or idle state of the protocol for controlling radio resources between the UE 102 and the RAN 105. For clarity, the examples below refer to the RRC_INACTIVE or RRC_IDLE state of the RRC protocol.

As used in this disclosure, the term "data" or "data packet" refers to signaling, control-plane information at a protocol layer of controlling radio resources (e.g., RRC); controlling mobility management (MM); controlling session management (SM); or non-signaling, non-control-plane information at protocol layers above the layer of the protocol for controlling radio resources (e.g., RRC), above the layer of the protocol for controlling mobility management (MM), above the layer of the protocol for controlling session management (SM), or above the layer of the protocol for controlling quality of service (QoS) flows (e.g., service data adaptation protocol (SDAP)). The data to which the UE and/or the RAN applies the techniques of this disclosure can include, for example, Internet of Things (IoT) data, ethernet traffic data, internet traffic data, or a short message service (SMS) message. Further, as discussed below, the UE 102 in some implementations applies these techniques only if the size of the data is below a certain threshold value.

In the example scenarios discussed below, the UE 102 transitions to the RRC_INACTIVE or RRC_IDLE state, then selects a cell of the base station 104 and exchanges data with the base station 104, either via the base station 106 or with the base station 104 directly, without transitioning to RRC_CONNECTED state. As a more specific example, after the UE 102 determines that data is available for uplink transmission in the RRC_INACTIVE or RRC_IDLE state, the UE 102 can apply one or more security functions to the UL data packet, generate a first UL protocol data unit (PDU) including the security-protected packet, include an uplink (UL) RRC message along with the first UL PDU in a second UL PDU, and transmit the second UL PDU to the RAN 105. The UE 102 includes a UE identity/identifier (ID) for the UE 102 in the UL RRC message. The RAN 105 can identify the UE 102 based on the UE ID. In some implementations, the UE ID can be an inactive Radio Network Temporary Identifier (I-RNTI), a resume ID, or a non-access stratum (NAS) ID. The NAS ID can be an S-Temporary Mobile Subscriber Identity (S-TMSI) or a Global Unique Temporary Identifier (GUTI).

The security function can include an integrity protection and/or encryption function. When integrity protection is enabled, the UE 102 can generate a message authentication code for integrity (MAC-I) to protect integrity of the data. Thus, the UE 102 in this case generates a security-protected packet including the data and the MAC-I. When encryption is enabled, the UE 102 can encrypt the data to obtain an encrypted packet, so that the security-protected packet includes encrypted data. When both integrity protection and encryption are enabled, the UE 102 can generate a MAC-I for protecting integrity of the data and encrypt the data along with the MAC-I to generate an encrypted packet and an encrypted MAC-I. The UE 102 then can transmit the security-protected packet to the RAN 105 while in the RRC_INACTIVE or RRC_IDLE state.

In some implementations, the data is an uplink (UL) service data unit (SDU) of the packet data convergence protocol (PDCP) or SDAP. The UE 102 applies the security function to the SDU and includes the secured SDU in a first UL PDU (e.g., a UL PDCP PDU). The UE 102 then includes the UL PDCP PDU in a second UL PDU such as a UL MAC PDU, which can be associated with the medium access control (MAC) layer. Thus, the UE 102 in these cases transmits the secured UL PDCP PDU in the UL MAC PDU. In some implementations, the UE 102 can include, in the UL MAC PDU, a UL RRC message. In further implementations, the UE 102 may not include a UL RRC message in the UL MAC PDU. In this case, the UE 102 may not include a UE ID of the UE 102 in the UL MAC PDU not including a UL RRC message. In yet further implementations, the UE 102 can include the UL PDCP PDU in a UL radio link control (RLC) PDU and then include the UL RLC PDU in the UL MAC PDU. In the case of including the UL RRC message in the UL MAC PDU, the UE 102 in some implementations generates an RRC MAC-I and includes the RRC MAC-I in the UL RRC message. For example, the RRC MAC-I is a resumeMAC-I field, as specified in 3GPP specification 38.331. In further implementations, the UE can obtain the RRC MAC-I from the UL RRC message with an integrity key (e.g., $K_{RRCint}$ key), an integrity protection algorithm, and other parameters COUNT (e.g., 32-bit, 64-bit or 128-bit value), BEARER (e.g., 5-bit value) and DIRECTION (e.g., 1-bit value).

In further implementations, the data is an uplink (UL) service data unit (SDU) of the NAS. The UE 102 applies the security function to the SDU and includes the secured SDU in a first UL PDU such as a NAS PDU, which can be associated with the NAS layer. For example, the NAS layer can be an MM sublayer or SM sublayer of 5G, Evolved Packet System (EPS), or 6G. Then the UE 102 can include the UL NAS PDU in a second UL PDU such as a UL RRC message. Thus, the UE 102 in these cases transmits the (first) secured UL NAS PDU in the UL RRC message. In some implementations, the UE 102 can include the UL RRC message in a UL MAC PDU and transmits the UL MAC PDU to a base station (e.g., base station 104 or 106) via a cell (e.g., cell 124 or 126). In this case, the UE 102 may not include an RRC MAC-I in the UL RRC message. Alternatively, the UE 102 may include an RRC MAC-I as described above.

In some implementations, the UL RRC message described above can be a common control channel (CCCH) message, an RRC resume request message, or an RRC early data request message. The UL RRC message can include a UE ID of the UE 102 as described above.

More generally, the UE 102 can secure the data using at least one of encryption and integrity protection, include the secured data as a security-protected packet in the first UL PDU, and transmit the first UL PDU to the RAN 105 in the second UL PDU.

In some scenarios and implementations, the base station 106 can retrieve the UE ID of the UE 102 from the UL RRC message and identify the base station 104 as the destination of the data in the first UL PDU, based on the determined UE ID. In one example implementation, the base station 106 retrieves the first UL PDU from the second UL PDU and transmits the first UL PDU to the base station 104. The base station 104 then retrieves the security-protected packet from the first UL PDU, applies one or two security functions to decrypt the data and/or check the integrity protection, and transmits the data to the CN 110 (e.g., SGW 112, UPF 162, MME 114 or AMF 164) or an edge server. In some implementations, the edge server can operate within the RAN 105. More specifically, the base station 104 derives at least one security key from UE context information of the UE 102. Then the base station 104 retrieves the data from the security-protected packet by using the at least one security key and transmits the data to the CN 110 or edge server. When the security-protected packet is an encrypted packet, the base station 104 decrypts the encrypted packet to obtain the data by using the at least one security key (e.g., an encryption and/or decryption key). If the security-protected packet is an integrity-protected packet, the integrity-protected packet may include the data and the MAC-I. The base station 104 can verify whether the MAC-I is valid for the security-protected packet by using the at least one security key (e.g., an integrity key). When the base station 104 confirms that the MAC-I is valid, the base station 104 sends the data to the CN 110 or edge server. However, when the base station 104 determines that the MAC-I is invalid, the base station 104 discards the security-protected packet. Further, if the security-protected packet is both encrypted and integrity-protected, the encrypted and integrity-protected packet may include the encrypted packet along with the encrypted MAC-I. The base station 104 in this case decrypts the encrypted packet and the encrypted MAC-I to obtain the data and the MAC-I. The base station 104 then determines whether the MAC-I is valid for the data. If the base station 104 determines that the MAC-I is valid, the base station 104 retrieves the data and forwards the data to the CN 110 or edge server. However, if the base station 104 determines that the MAC-I is invalid, the base station 104 discards the packet.

In another implementation, the base station 106 retrieves the security-protected packet from the first UL PDU. The base station 106 performs a retrieve UE context procedure with the base station 104 to obtain UE context information of the UE 102 from the base station 104. The base station 106 derives at least one security key from the UE context information. Then the base station 106 retrieves the data from the security-protected packet by using the at least one security key and transmits the data to the CN 110 (e.g., UPF 162) or an edge server. When the security-protected packet is an encrypted packet, the base station 106 decrypts the encrypted packet to obtain the data by using the at least one security key (e.g., an encryption and/or decryption key). If the security-protected packet is an integrity-protected packet, the integrity protected packet may include the data and the MAC-I. The base station 106 can verify whether the MAC-I is valid for the security-protected packet by using the at least one security key (e.g., an integrity key). When the base station 106 confirms that the MAC-I is valid, the base station 106 sends the data to the CN 110. On the other hand, when the base station 106 determines that the MAC-I is invalid, the base station 106 discards the security-protected packet. Further, if the security-protected packet is both encrypted and integrity-protected, the encrypted and integrity-protected packet may include the encrypted packet along with the encrypted MAC-I. The base station 106 in this case decrypts the encrypted packet and the encrypted MAC-I to obtain the data and the MAC-I. The base station 106 then determines whether the MAC-I is valid for the data. If the base station 106 determines that the MAC-I is valid, the base station 106 retrieves the data and forwards the data to the data CN 110. However, if the base station 106 determines that the MAC-I is invalid, the base station 106 discards the packet.

In other scenarios and implementations, the base station 104 can retrieve the UE ID of the UE 102 from the UL RRC message and identify that the base station 104 stores UE context information of the UE 102. Thus, the base station 104 retrieves the security-protected packet from the first UL PDU, retrieves the data from the security-protected packet, and sends the data to the CN 110 or edge server as described above.

Further, the RAN 105 in some cases transmits data in the downlink (DL) direction to the UE 102 operating in the RRC_INACTIVE or RRC_IDLE state.

For example, when the base station 104 determines that data is available for downlink transmission to the UE 102 currently operating in the RRC_INACTIVE or RRC_IDLE state, the base station 104 can apply at least one security function to the data to generate a security-protected packet, generate a first DL PDU including the security-protected packet, and the first DL PDU in a second DL PDU. To secure the data, the base station 104 can apply the security function (e.g., integrity protection and/or encryption) to the data. More particularly, when integrity protection is enabled, the base station 104 generates a MAC-I for protecting integrity of the data, so that the security-protected packet includes the data and the MAC-I. When encryption is enabled, the base station 104 encrypts the data to generate an encrypted packet, so that the security-protected packet is an encrypted packet. Further, when both integrity protection and encryption are enabled, the base station 104 can generate a MAC-I for protecting the integrity of the data and encrypt the data along with the MAC-I to generate an encrypted packet and an encrypted MAC-I. The base station 104 in some implementations generates a first DL PDU, such as a DL PDCP PDU, using the security-protected packet, includes the first DL PDU in a second DL PDU associated with the MAC layer for example (e.g., a DL MAC PDU), and transmits the second DL PDU to the UE 102 without first causing the UE 102 to transition from the RRC_INACTIVE or RRC_IDLE state to the RRC_CONNECTED state. In some implementations, the base station 104 includes the DL PDCP PDU in a DL RLC PDU, includes the DL RLC PDU in the DL MAC PDU and transmits the DL MAC PDU to the UE 102 without first causing the UE 102 to transition from the RRC_INACTIVE or RRC_IDLE state to the RRC_CONNECTED state.

In another implementation, the base station 104 transmits the first DL PDU to the base station 106, which then generates a second PDU (e.g., a DL MAC PDU) including the first DL PDU and transmits the second DL PDU to the UE 102 without first causing the UE 102 to transition from the RRC_INACTIVE or RRC_IDLE state to the RRC_CONNECTED state. In some implementations, the base station 106 generates a DL RLC PDU including the first DL PDU and includes the DL RLC PDU in the second DL PDU. In yet another implementation, the base station 104 includes the first DL PDU in a DL RLC PDU and transmits the DL RLC PDU to the base station 106, which then generates a second DL PDU (e.g., a DL MAC PDU), including the DL RLC PDU, and transmits the second DL PDU to the UE 102.

In some implementations, the base station (i.e., the base station 104 or 106) generates a downlink control information (DCI) and a cyclic redundancy check (CRC) scrambled with an ID of the UE 102 to transmit the second DL PDU generated by the base station. In some implementations, the ID of the UE 102 can be a Radio Network Temporary Identifier (RNTI). For example, the RNTI can be a cell RNTI (C-RNTI), a temporary C-RNTI or an inactive C-RNTI. The base station transmits the DCI and scrambled CRC on a physical downlink control channel (PDCCH) to the UE 102 operating in the RRC_INACTIVE or RRC_IDLE state. The base station scrambles the CRC with the ID of the UE 102. In some implementations, the base station may assign the ID of the UE 102 to the UE 102 in a random access response that the base station transmits in a random access procedure with the UE 102 before transmitting the DCI and scrambled CRC. In further implementations, the base station may assign the ID of the UE 102 to the UE 102 in an RRC message (e.g., RRC release message or an RRC reconfiguration message) that the base station transmits to the UE 102 before transmitting the DCI and scrambled CRC, e.g., while the UE 102 was in the RRC_CONNECTED state.

The UE 102 operating in the RRC_INACTIVE or RRC_IDLE state can receive the DCI and scrambled CRC on the PDCCH. Then the UE 102 confirms that a physical downlink shared channel (PDSCH), including the second DL PDU, is addressed to the UE 102 according to the ID of the UE 102, DCI, and scrambled CRC. The UE 102 then can retrieve the data from the security-protected packet. If the security-protected packet is an encrypted packet, the UE 102 can decrypt the encrypted packet using the appropriate decryption function and the security key to obtain the data. If the security-protected packet is the integrity-protected packet including the data and the MAC-I, the UE 102 can determine whether the MAC-I is valid. If the UE 102 confirms that the MAC-I is valid, the UE 102 retrieves the data. If, however, the UE 102 determines that the MAC-I is invalid, the UE 102 discards the packet. Finally, when the security-protected packet is both encrypted and integrity-protected, with encrypted data and an encrypted MAC-I, the UE 102 can decrypt the encrypted packet and encrypted MAC-I to obtain the data and the MAC-I. The UE 102 can then verify that the MAC-I is valid for the data. If the UE 102 confirms that the MAC-I is valid, the UE 102 retrieves and processes the data. Otherwise, when the UE 102 determines that the MAC-I is invalid, the UE 102 discards the data.

The base station 104 is equipped with processing hardware 130 that can include one or more general-purpose processors (e.g., CPUs) and a non-transitory computer-readable memory storing instructions that the one or more general-purpose processors execute. Additionally or alternatively, the processing hardware 130 can include special-purpose processing units. The processing hardware 130 in an example implementation includes a Medium Access Control (MAC) controller 132 configured to perform a random access procedure with one or more user devices, receive uplink MAC protocol data units (PDUs) to one or more user devices, and transmit downlink MAC PDUs to one or more user devices. The processing hardware 130 can also include a Packet Data Convergence Protocol (PDCP) controller 134 configured to transmit DL PDCP PDUs in accordance with which the base station 104 can transmit data in the downlink direction, in some scenarios, and receive UL PDCP PDUs in accordance with which the base station 104 can receive data in the uplink direction, in other scenarios. The processing hardware further can include an RRC controller 136 to implement procedures and messaging at the RRC sublayer of the protocol communication stack. The processing hardware 130 in an example implementation includes an RRC inactive controller 138 configured to manage uplink and/or downlink communications with one or more UEs operating in the RRC_INACTIVE or RRC_IDLE state. The base station 106 can include generally similar components. In particular, components 142, 144, 146, and 148 can be similar to the components 132, 134, 136, and 138, respectively.

The UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes an RRC inactive controller 158 configured to manage uplink and/or downlink communications when the UE 102 operates in the RRC_INACTIVE state. The processing hardware 150 in an example implementation includes a Medium Access Control (MAC) controller 152 configured to perform a random access procedure with a base station, transmit uplink MAC protocol data units (PDUs) to the base station, and receive downlink MAC PDUs from the base station. The processing hardware 150 can also include a PDCP controller 154 configured to, in some scenarios, transmit DL PDCP PDUs in accordance with which the base station 106 can transmit data in the downlink direction, and, in further scenarios, receive UL PDCP PDUs in accordance with which the base station 106 can receive data in the uplink direction. The processing hardware further can include an RRC controller 156 to implement procedures and messaging at the RRC sublayer of the protocol communication stack.

Figure 1B:
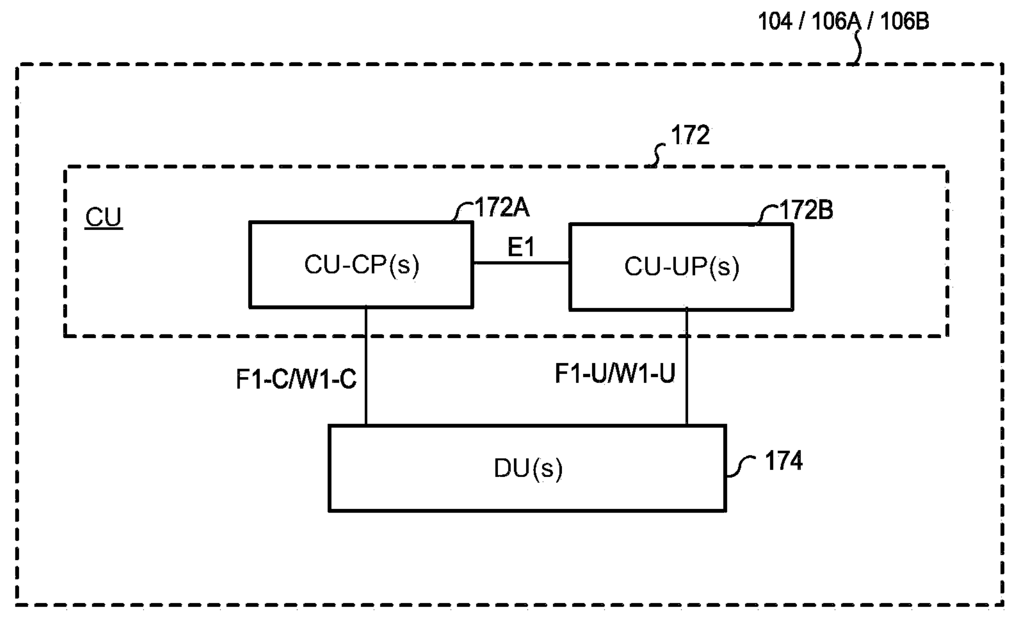
FIG. 1B is a block diagram of an example base station including a central unit (CU) and a distributed unit (DU) that can operate in the system of FIG. 1A.

FIG. 1B depicts an example distributed or disaggregated implementation of any one or more of the base stations 104, 106. In this implementation, the base station 104, 106 includes a central unit (CU) 172 and one or more DUs 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include a PDCP controller, an RRC controller and/or an RRC inactive controller such as PDCP controller 134, 144, RRC controller 136, 146 and/or RRC inactive controller 138, 148. In some implementations, the CU 172 can include a radio link control (RLC) controller configured to manage or control one or more RLC operations or procedures. In further implementations, the CU 172 does not include an RLC controller.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a MAC controller (e.g., MAC controller 132, 142) configured to manage or control one or more MAC operations or procedures (e.g., a random access procedure), and/or an RLC controller configured to manage or control one or more RLC operations or procedures. The process hardware can also include a physical layer controller configured to manage or control one or more physical layer operations or procedures.

In some embodiments, the RAN 105 supports Integrated Access and Backhaul (IAB) functionality. In some implementations, the DU 174 operates as an (IAB)-node, and the CU 172 operates as an IAB-donor.

In some implementations, the CU 172 can include a logical node CU-CP 172A that hosts the control plane part of the PDCP protocol of the CU 172. The CU 172 can also include logical node(s) CU-UP 172B that hosts the user plane part of the PDCP protocol and/or Service Data Adaptation Protocol (SDAP) protocol of the CU 172. The CU-CP 172A can transmit control information (e.g., RRC messages, F1 application protocol messages), and the CU-UP 172B can transmit the data packets (e.g., SDAP PDUs or Internet Protocol packets).

The CU-CP 172A can be connected to multiple CU-UP 172B through the E1 interface. The CU-CP 172A selects the appropriate CU-UP 172B for the requested services for the UE 102. In some implementations, a single CU-UP 172B can connect to multiple CU-CP 172A through the E1 interface. The CU-CP 172A can connect to one or more DU 174*s* through an F1-C interface. The CU-UP 172B can connect to one or more DU 174 through the F1-U interface under the control of the same CU-CP 172A. In some implementations, one DU 174 can connect to multiple CU-UP 172B under the control of the same CU-CP 172A. In such implementations, the connectivity between a CU-UP 172B and a DU 174 is established by the CU-CP 172A using Bearer Context Management functions.

Figure 2A:
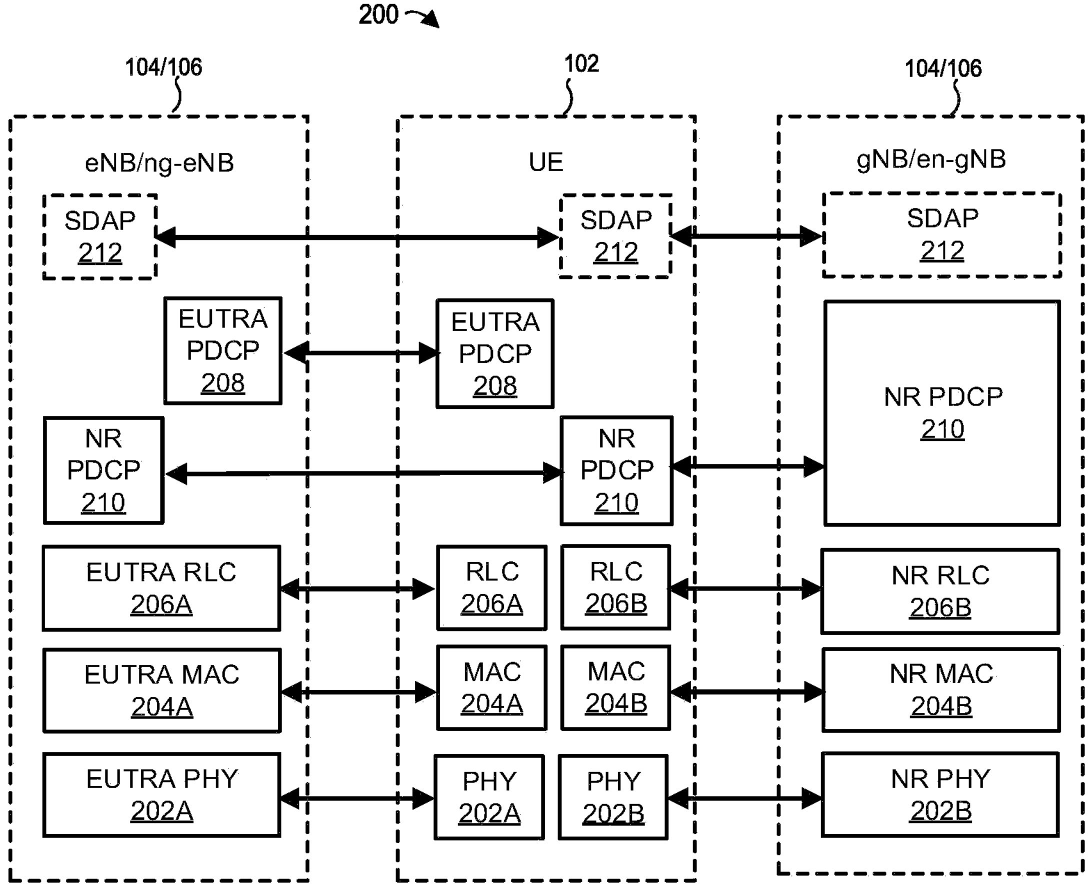
FIG. 2A is a block diagram of an example protocol stack according to which the UE of FIGS. 1A-B can communicate with base stations.

FIG. 2A illustrates, in a simplified manner, an example protocol stack 200 according to which the UE 102 can communicate with an eNB/ng-eNB or a gNB (e.g., one or more of the base stations 104, 106).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to an EUTRA PDCP sublayer 208 and, in some cases, to an NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides data transfer services to the NR PDCP sublayer 210. The NR PDCP sublayer 210 in turn can provide data transfer services to Service Data Adaptation Protocol (SDAP) 212 or a radio resource control (RRC) sublayer (not shown in FIG. 2). The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP 210 over EUTRA RLC 206A, and SDAP sublayer 212 over the NR PDCP sublayer 210.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide signaling radio bearers (SRBs) or RRC sublayer (not shown in FIG. 2) to exchange RRC messages or non-access-stratum (NAS) messages, for example. On a user plane, the EUTRA PDCP sublayer 208 and the NR PDCP sublayer 210 can provide DRBs to support data exchange. Data exchanged on the NR PDCP sublayer 210 can be SDAP PDUs, Internet Protocol (IP) packets or Ethernet packets.

Figure 2B:
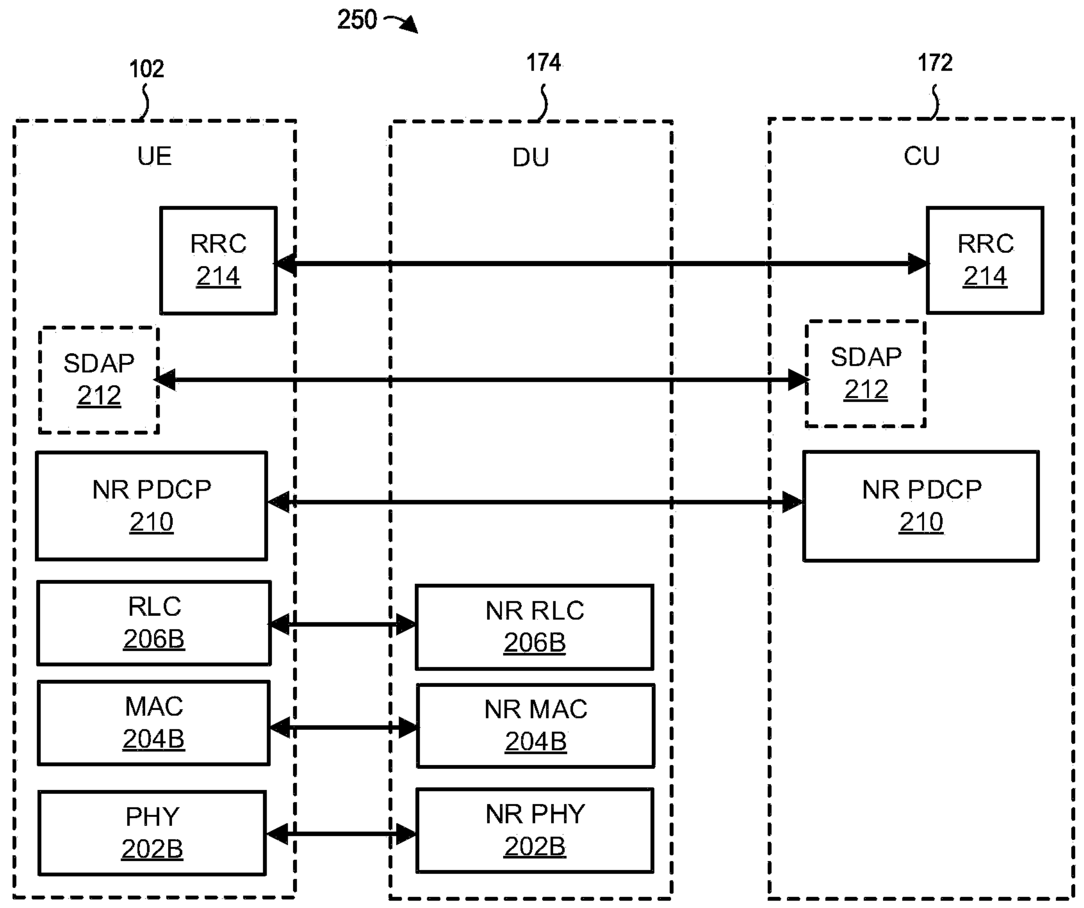
FIG. 2B is a block diagram of an example protocol stack according to which the UE of FIGS. 1A-B can communicate with a DU and a CU of a base station.

FIG. 2B illustrates, in a simplified manner, an example protocol stack 250 which the UE 102 can communicate with a DU (e.g., DU 174) and a CU (e.g., CU 172). The radio protocol stack 200 is functionally split as shown by the radio protocol stack 250 in FIG. 2B. The CU at any of the base stations 104 or 106 can hold all the control and upper layer functionalities (e.g., RRC 214, SDAP 212, NR PDCP 210), while the lower layer operations (e.g., NR RLC 206B, NR MAC 204B, and NR PHY 202B) are delegated to the DU. To support connection to a 5GC, NR PDCP 210 provides SRBs to RRC 214, and NR PDCP 210 provides DRBs to SDAP 212 and SRBs to RRC 214.

Next, several example scenarios that involve several components of FIG. 1A and relate to transmitting and/or receiving data in an inactive or idle state are discussed with reference to FIGS. 3A-3I. Generally speaking, events in FIGS. 3A-3I that are the same are labeled with the same reference numbers. To simplify the following description, the "inactive state" can represent the RRC_INACTIVE or RRC_IDLE state, and the connected state can represent the RRC_CONNECTED state.

Figure 3A:
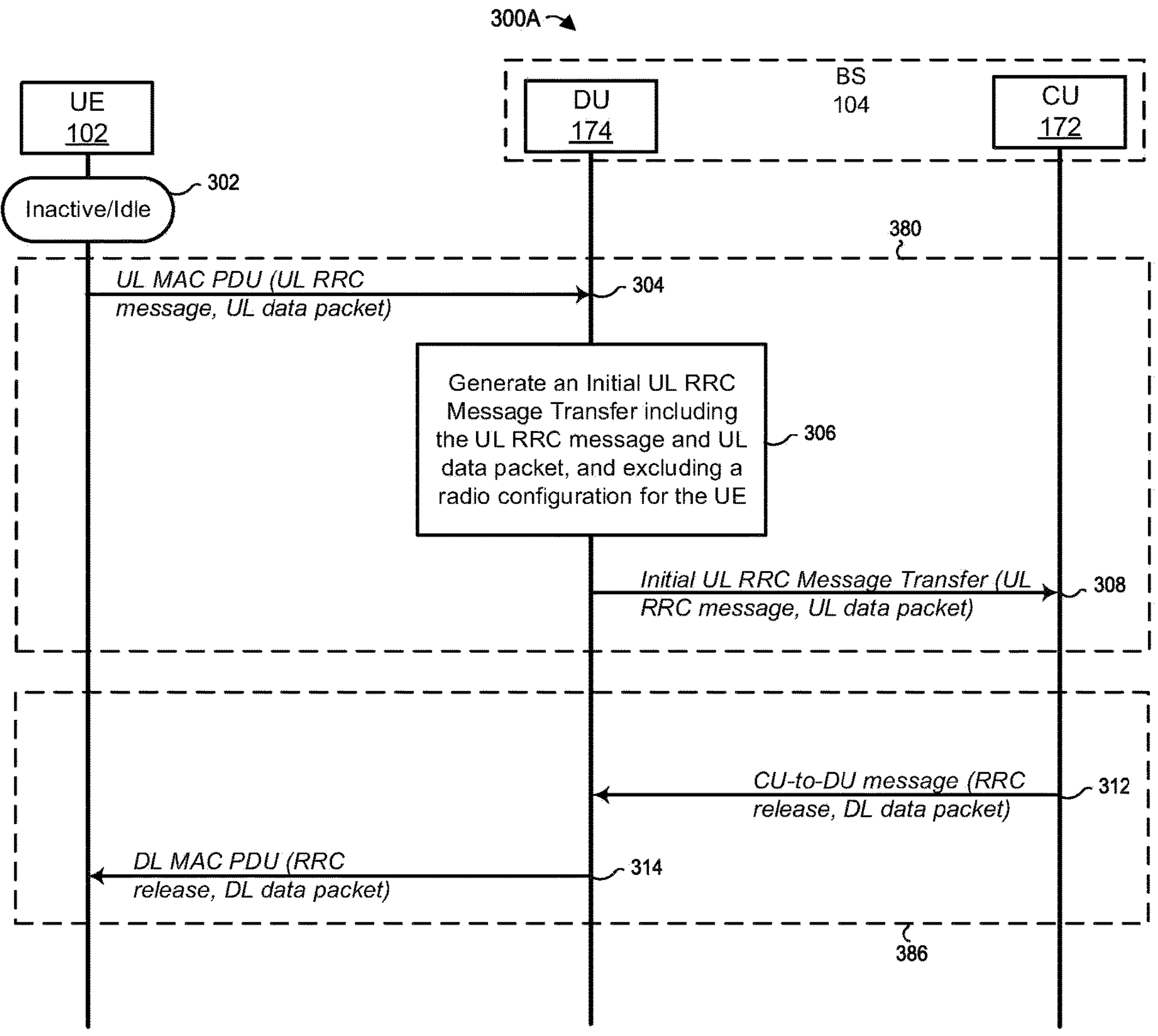
FIG. 3A illustrates an example scenario in which a UE initiates early data transmission of an uplink data packet, a DU excludes a radio configuration from a transfer message to the CU, so as to prevent the CU from transitioning the UE to the connected state, and the CU responds with a downlink packet.

Referring first to FIG. 3A, in a scenario 300A, the UE 102 initially operates 302 in an inactive state with the base station 104 including a CU 172 and a DU 174. In some scenarios and implementations, the UE 102 was in a connected state with the RAN 105 (e.g., the base station 104, base station 106, or another base station not shown in FIG. 1A), before the UE 102 operates 302 in the inactive state. After a (first) certain period of data inactivity for the UE 102, the RAN 105 can determine that neither the RAN 105 nor the UE 102 has transmitted any data in the downlink direction or the uplink direction, respectively, during the (first) certain period. In response to the determination, the RAN 105 can transmit a first RRC release message (e.g., RRCRelease message or RRCConnectionRelease message) to the UE 102 and instruct the UE 102 to transition to the inactive state. The UE 102 transitions to the inactive state upon receiving the first RRC release message. The RAN 105 can assign an I-RNTI or a resume ID to the UE 102 and include the assigned value in the first RRC release message. In some embodiments, after the UE 102 transitions to the inactive state, the UE 102 may perform one or more RAN notification area (RNA) updates with the CU 172 via the DU 174 without state transitions.

At a later time, the UE 102 in the inactive state initiates early data transmission (EDT) to transmit uplink (UL) data or receive downlink (DL) data. The UE 102 can initiate early data communication in order to transmit at least one UL data packet or to receive at least one DL data packet. In cases where the UE 102 initiates EDT to transmit UL data while the UE 102 is in the inactive state, the initial early data communication can be mobile originating (MO) early data transmission (EDT). In cases where the UE 102 initiates EDT to receive DL data while the UE 102 is in the inactive state, the initial early data communication can be mobile terminating (MT) EDT (i.e., early data reception from the viewpoint of the UE 102). In such cases, the UE 102 at event 302 receives from the DU 174 a paging message, which includes a UE ID of the UE 102 and an EDT indication. For example, the UE ID can be the I-RNTI, the resume ID, or a NAS ID (e.g., S-TMSI or 6G-S-TMSI, or a specific ID for MT EDT). In response to the paging message (i.e., the UE ID and the EDT indication), the UE 102 initiates early data communication to receive DL data from the DU 174 and CU 172.

The (UL/DL) data in some example scenarios is an Internet Protocol (IP) packet, an Ethernet packet, or an application packet. In other scenarios, the data is a PDU (e.g., RRC PDU, PDCP PDU, RLC PDU or MAC PDU) that includes an RRC message, an NAS message, an IP packet, an Ethernet packet, or an application packet. Still further, the data in some scenarios can be an RRC PDU including an NAS PDU, such that the NAS PDU includes an IP packet, an Ethernet packet, or an application packet. In some implementations, the UE 102 can determine whether the UL data qualifies for transmission in the inactive state in view of one or more of such factors as whether the data is an IMS packet; whether the data is associated with a radio bearer (e.g., DRB or SRB) not suitable or configured for early data transmission; or whether the data is an NAS message for initiating a particular NAS procedure, the size of the data, etc. When the UE 102 determines that the UL data does not qualify for transmission in the inactive state, the UE 102 can perform an RRC procedure (e.g., RRC connection establishment procedure or RRC resume procedure) to transition to the connected state.

In response to or after initiating early data transmission, the UE 102 generates an initial UL MAC PDU, which includes a UL RRC and transmits 304 the initial UL MAC PDU to the DU 174 on cell 124. The DU 174 retrieves the UL RRC message from the initial UL MAC PDU and generates an Initial UL RRC Message Transfer message including the UL RRC message, and excluding a radio configuration (e.g., a CellGroupConfig IE) for the UE. In this manner, the DU 174 prevents the CU 172 from activating the radio connection in response to the uplink data packet. Although the DU 174 prevents the CU 172 from activating the radio connection in response to the uplink data packet in the Initial UL RRC Message Transfer message, the CU 172 may determine to reactivate the radio connection due to a number of other factors, as is discussed below.

In scenarios in which the UE 102 initiates early data communication to transmit UL data, such as the scenario 300A, the UE 102 includes at least one UL data packet in the initial UL MAC PDU that the UE 102 transmits 304. In scenarios in which the UE 102 initiates early data communication to receive DL data, the UE 102 does not include an UL data packet in the UL MAC PDU that the UE 102 transmits 304. In such scenarios, the UE 102 can include an EDT indication in the UL MAC PDU or the UL RRC message to indicate to the base station 104 that the UE 102 is initiating early data communication to receive DL data.

If the UE 102 includes UL data in the initial UL MAC PDU, the DU 174 retries the UL data from the initial UL MAC PDU. In such cases, the DU 174 can include the UL data in the Initial UL RRC Message Transfer message. Alternatively, the DU 174 can send the UL data to the CU 172 separately, via a user-plane (UP) connection as described below. After receiving the Initial UL RRC Message Transfer message, the CU 172 in some implementations sends a first CU-to-DU message (not shown) to the DU 174 to establish a UE Context of the UE 102 at the DU 174 and/or a UP connection between the CU 172 and DU 174 (e.g., F1-U tunnel or W-1 tunnel) for receiving the UL data and/or subsequent early data communication. In response, the DU 174 can send (not shown) a first DU-to-CU message to the CU 172. In some implementations, the first CU-to-DU message and the first DU-to-CU message can be a UE Context Setup Request message and a UE Context Setup Response message, respectively.

In some implementations, the DU 174 refrains from generating a radio configuration (e.g., a CellGroupConfig IE) for a UE (e.g., the UE 102) if the DU 174 determines that a received UL RRC message (e.g., an RRCResumeRequest message, an RRCConnectionResumeRequest message, or a new UL RRC message defined for EDT) includes an EDT indication (e.g., mobile originating (MO) EDT). The EDT indication can be a field or information element (IE) (e.g., resumeCause or ResumeCause). In further implementations, the DU 174 refrains from generating a radio configuration (e.g., a CellGroupConfig IE) for the UE 102 if the DU 174 receives a UL RRC message (e.g., the UL RRC message at event 304) and UL data (e.g., the UL data packet at event 304) in a UL MAC PDU (e.g., the UL MAC PDU at event 304) from a UE (e.g., the UE 102) operating in the inactive state. In still further implementations, the DU 174 generates a radio configuration (e.g., a CellGroupConfig IE) for the UE 102 if the DU 174 receives a UL RRC message including an RRC resume request and/or an RRC setup request, such as in FIG. 6, below.

After generating the Initial UL RRC Message Transfer message, the DU 174 sends 308 the Initial UL RRC Message Transfer message to the CU 172 via control plane (CP) interface (e.g., F1-C interface or W1-C interface). In further embodiments, the DU 174 may send 308 the Initial UL RRC Message Transfer message to the CU 172 via UP interface. Alternatively, the DU 174 can send 308 to the CU 172 a DU-to-CU message including the UL RRC message and the UL data packet. For example, the DU-to-CU message can be a new or existing F1AP message or W1AP message specified in 3GPP specification 38.473 or 37.473. Then, the CU 172 can retrieve the UL data packet from the Initial UL RRC Message Transfer message or the DU-to-CU message and send the UL data packet to the CN 110 (e.g., SGW 112, UPF 162, MME 114, or AMF 164). In further embodiments, the DU 174 may transmit 308 the UL data packet to the CU 172 via the UP connection. For example, the DU 174 transmits a tunneling protocol packet, including the UL data packet to the CU 172, via the UP connection. The CU 172 retrieves the UL data packet from the tunneling protocol packet and sends the UL data packet to the CN 110. Alternatively, the CU 172 can transmit the UL data packet to an edge server instead of the CN 110. In some implementations, the edge server can operate within the RAN 105. The events 304, 306, and 308 are collectively referred to in FIG. 3A as an initial UL data communication 380.

After the CU 172 receives the Initial UL RRC Message Transfer message, the CU 172 may transmit 312 a CU-to-DU message including an RRC Release message and a DL data packet to the DU 174, which in turn transmits 314 a DL MAC PDU including the RRC release message and the DL data packet to the UE 102. The CU 172 can receive the DL data packet from the CN 110 or the edge server. In some implementations or scenarios, the CU transmits the RRC release message and the DL data packet in a same DL MAC PDU. In other implementations or scenarios, the CU 172 transmits the RRC release message in a first DL MAC PDU and the DL data packet in a second DL MAC PDU. As yet another alternative, the CU 172 can transmit a DL data packet in segments, with the DU 174 transmitting a first segment of the DL data packet in a first DL MAC PDU and transmitting a second segment of the DL data packet in a second DL MAC PDU. The CU 172 also can transmit the RRC release message with a segment of the DL data packet (e.g., with the second segment of the DL data packet in the second DL MAC PDU). When the UE 102 receives the RRC release message, the UE 102 determines the early data communication (session) ends and stays in the inactive state.

In some implementations, the CU-to-DU message 312 can be a UE Context Release Command message. In response, the DU 174 can send to the CU 172 a UE Context Release Complete message. In further implementations, the CU-to-DU message 312 can be a DL RRC Message Transfer message or a UE Context Modification Request message. The DU 174 can send to the CU 172 a UE Context Modification Response message in response to the UE Context Modification Request message. In such cases, the CU 172 can send to the DU 174 another UE Context Release Command message for the UE 102 after sending the CU-to-DU interface message to the DU 174. In response, the DU 174 can send to the CU 172 another UE Context Release Complete message. In yet further implementations, the CU-to-DU message can be a new or existing F1AP message or W1AP message specified in 3GPP specification 38.473 or 37.473.

To transmit the uplink data packet at event 304, the UE 102 in some implementations applies at least one security function to the UL data packet to generate a security-protected packet. The at least one security function includes integrity protection and/or encryption. The RRC controller 156 generates the UL RRC message. After applying the at least one security function, the PDCP controller 154 includes the security-protected packet in a UL PDCP PDU. In some implementations, the MAC controller 152 includes the UL RRC message and the UL PDCP PDU in the UL MAC PDU. In further implementations, an RLC controller of the UE 102 (not shown in FIG. 1A) includes the UL PDCP PDU in a UL RLC PDU and the MAC controller 152 includes the UL RRC message and the UL RLC PDU in the UL MAC PDU.

To transmit the RRC release message and DL data packet at event 312, the CU 172 in some implementations applies at least one security function (e.g., a security function similar to the at least one security function applied by the UE 102) to the RRC release message and the DL data packet to generate a first security-protected packet and a second security-protected packet, respectively. The at least one security function includes integrity protection and/or encryption. After applying the at least one security function, the PDCP controller 134 includes the first security-protected packet and second security-protected packet in a first DL PDCP PDU and a second DL PDCP PDU, respectively. In some implementations, the MAC controller 152 includes the first DL PDCP PDU and the second DL PDCP PDU in the DL MAC PDU. In further implementations, an RLC controller of the DU 174 (not shown in FIG. 1A) includes the first DL PDCP PDU and the second DL PDCP PDU in a first DL RLC PDU respectively, and the MAC controller 152 includes the first DL RLC PDU and second DL RLC PDU in the DL MAC PDU. In yet further implementations, the RLC controller includes the first DL PDCP PDU in a DL RLC PDU and does not include the second DL PDCP PDU in a DL RLC PDU, and the MAC controller 152 includes the DL RLC PDU and the second DL PDCP PDU in the DL MAC PDU. In yet further implementations, the RLC controller includes the second DL PDCP PDU in a DL RLC PDU and does not include the first DL PDCP PDU in a DL RLC PDU, and the MAC controller 152 includes the DL RLC PDU and the first DL RLC PDU in the DL MAC PDU.

In some implementations, the UE 102 in the inactive state can perform a random access procedure with the DU 174 to transmit the UL data packet at event 304. For example, the random access procedure can be a four-step random access procedure or a two-step random access procedure. In the case of the four-step random access procedure, the UE 102 transmits a random access preamble to the base station 104 and, in response, the base station 104 transmits to the UE 102 a random access response (RAR) including an uplink grant, and the UE 102 transmits 304 the UL MAC PDU in accordance with the uplink grant. The DU 174 receives 304 the UL MAC PDU in accordance with the uplink grant in the RAR. In the case of the two-step random access procedure, the UE 102 transmits 304 to the DU 174 a message A including a random access preamble and the UL MAC PDU in accordance with two-step random access configuration parameters. The UE 102 receives the two-step random access configuration parameters in system information broadcast by the DU 174 on cell 124 before transmitting 304 the UL MAC PDU. The DU 174 receives 304 the UL MAC PDU in accordance with the two-step random access configuration parameters. In further implementations, the UE 102 can transmit 304 the UL MAC PDU on radio resources configured in a preconfigured uplink resources (PUR) configuration or a configured grant (CG) configuration. The CU 172 can include the PUR configuration or CG configuration to the UE 102 in the first RRC release message. Thus, the base station 104 receives 304 the UL MAC PDU on the radio resources.

Figure 3B:
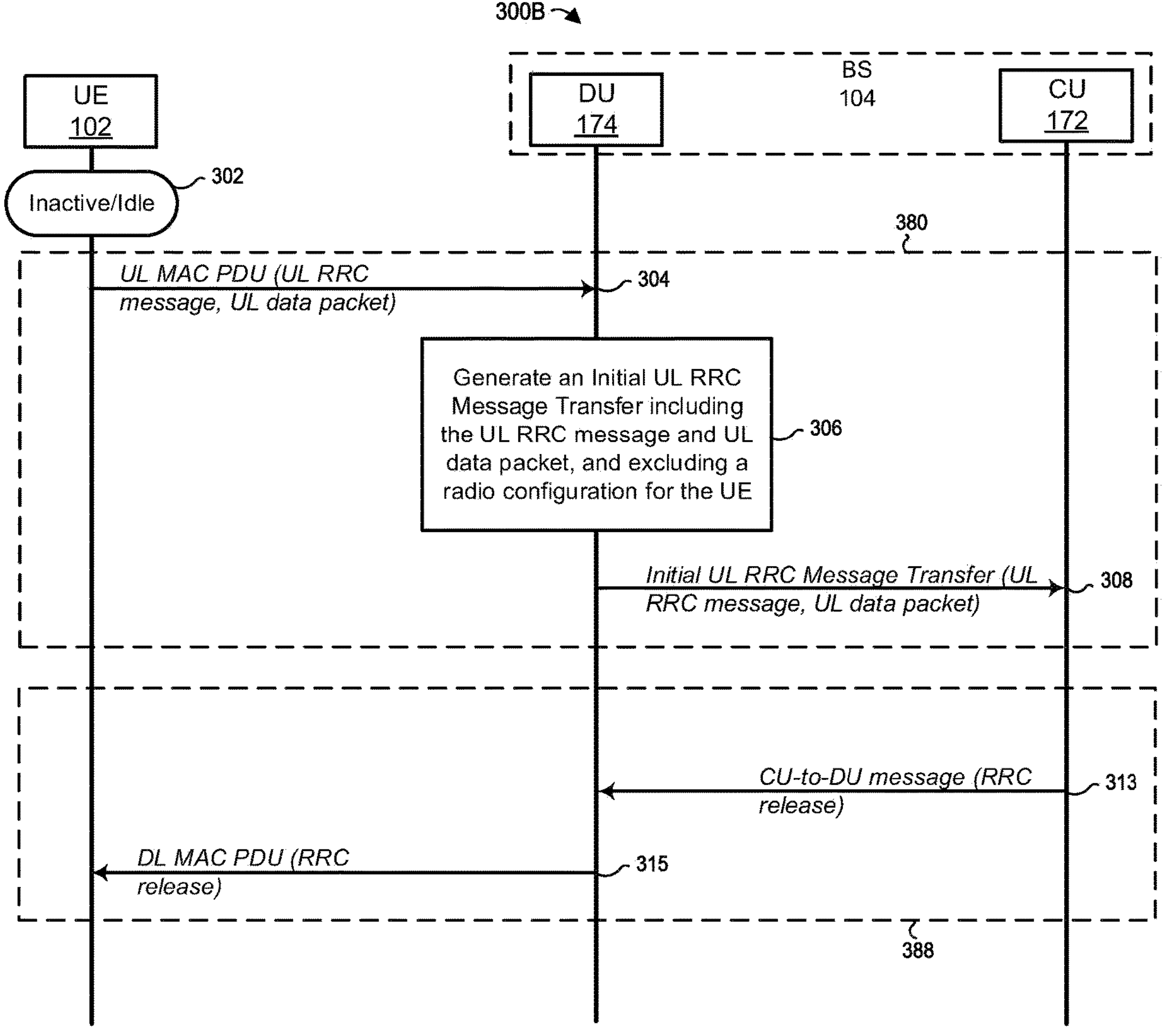
FIG. 3B illustrates a scenario similar to that of FIG. 3A, but in which the CU does not transmit a downlink data packet to the UE via the DU.

Referring next to FIG. 3B, a scenario 300B involves the UE 102, operating in an inactive state, initiating early data transmission with the base station 104 including a CU 172 and a DU 174. Scenario 300B is similar to scenario 300A, except that here the CU 172 does not transmit a DL data packet to the UE via the DU 174. Events in scenario 300B similar to those discussed above are labeled with similar reference numbers. The differences between the scenarios of FIG. 3A and FIG. 3B are discussed below.

After the CU 172 receives 308 the Initial UL RRC Message Transfer message, the CU 172 may transmit 313 a CU-to-DU message including an RRC release message to the DU 174, which in turn transmits 315 a DL MAC PDU including the RRC release message to the UE 102. Compared to events 312 and 314 of FIG. 3A, the CU 172 in scenario 300B does not transmit a DL data packet with the RRC release message to the UE 102 via the DU 174. When the UE 102 receives the RRC release message, the UE 102 determines that the early data communication (session) ends and remains in the inactive state. The messages of events 313 and 315 otherwise may be similar to the messages sent in events 312 and 314 of FIG. 3A. As described previously, the CU 172 may, in some implementations, apply at least one security function to the RRC message to generate a security-protected packet at event 313, similar to the security function applied at event 312 in FIG. 3A. Events 313 and 315 may be collectively referred to as RRC release procedure 388.

Figures 3C, 3D:
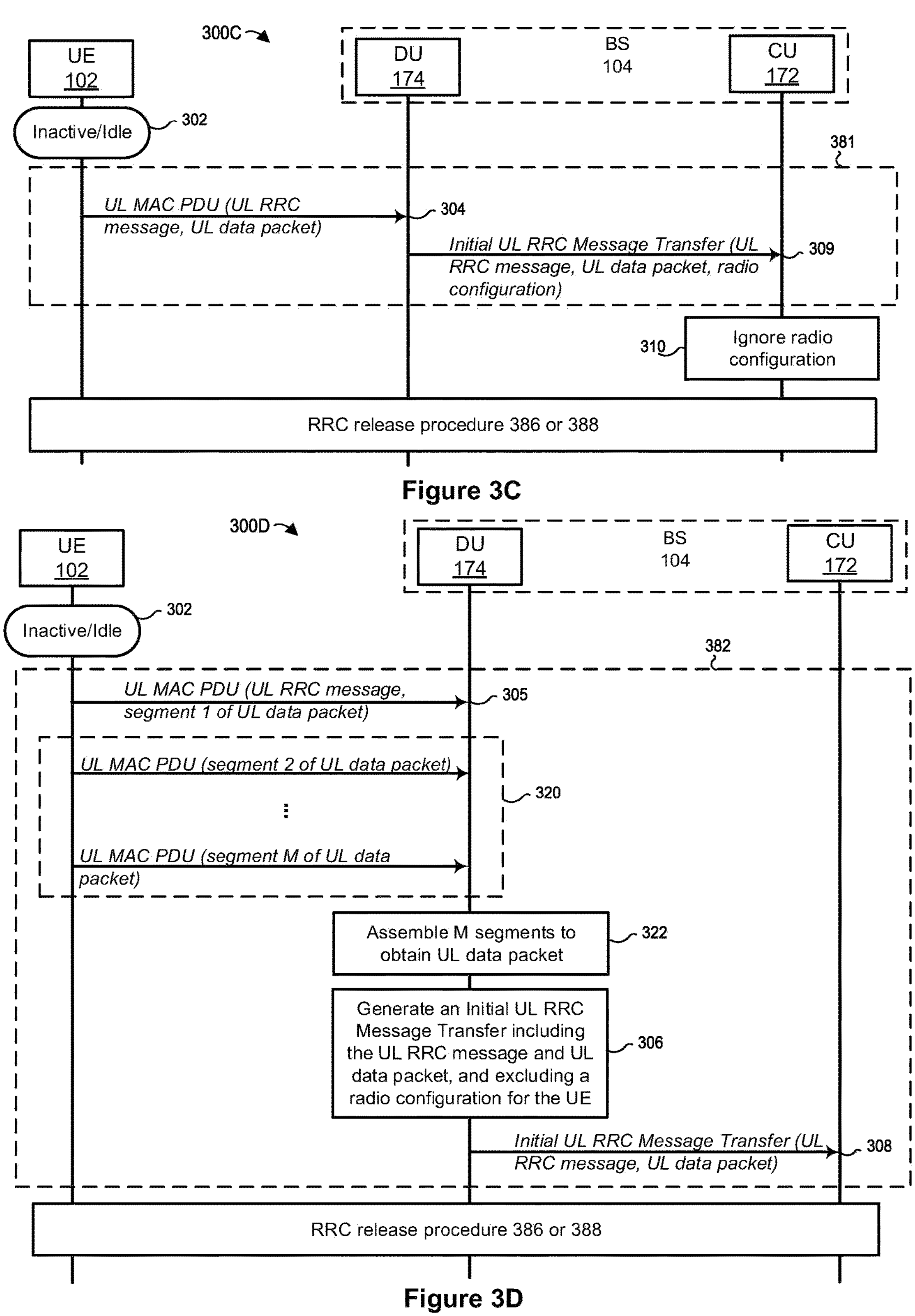
FIG. 3C illustrates a scenario similar to that of FIG. 3A, but in which the CU receives from the DU, and discards, a radio configuration for the UE.
FIG. 3D illustrates a scenario similar to that of FIG. 3A, but in which the UE transmits the uplink data packet to the DU via multiple segments in respective uplink MAC PDUs.

Next, FIG. 3C illustrates a scenario 300C involving the UE 102, operating in an inactive state, initiating early data transmission with the base station 104 including a CU 172 and a DU 174. Scenario 300C is similar to scenario 300A, except that here the CU 172 receives from the DU 174, and discards, a radio configuration for the UE 102. Events in scenario 300C similar to those discussed above are labeled with similar reference numbers. The differences between the scenarios of FIG. 3A and FIG. 3C are discussed below.

After the DU 174 receives 304 the UL MAC PDU from the UE 102 operating in an inactive state, the DU 174 generates an Initial UL RRC Message Transfer message, similar to the message generated at event 306 in FIG. 3A. However, the message of event 309 includes a radio configuration (e.g., a CellGroupConfig IE) for the UE 102. The Initial UL RRC Message Transfer also may include a UL message associated with a protocol for controlling radio resources and related to the UE 102 (e.g., an RRC message) and may additionally include a UL data packet from the UE 102. In further embodiments, the DU 174 may generate a message to the CU 172 including an indication of EDT. In still further embodiments, the DU 174 may generate a message to the CU 172 including an indication that the UE 102 is in an inactive state.

After the CU 172 receives 309 the Initial UL RRC Message Transfer, the CU 172 may process the UL data packet from the DU 174. In some embodiments, processing the UL data packet includes generating a DL data packet and applying at least one security function (e.g., a security function similar to the at least one security function applied before event 312 in FIG. 3A) to the RRC message and the DL data packet to generate a first security-protected packet and a second security-protected packet, respectively. The at least one security function may include integrity protection and/or encryption.

In some embodiments, the CU 172 determines 310 to ignore the radio configuration, e.g., by refraining from transmitting a radio configuration received from the DU 174. Depending on the implementation, the CU 172 may make the determination to ignore 310 the radio configuration based at least on the Initial UL RRC Message Transfer message, in response to an indication of EDT received from the DU 174 (e.g., a flag or an information element), upon determining that the UE 102 is currently in an inactive state (e.g., RRC_INACTIVE, RRC_IDLE), upon determining that the UL message is a request to set up a new radio connection, upon determining that a certain amount of time has passed without receiving an indication that the UE 102 has transitioned away from the inactive state, etc. Further, the CU 172 may determine to refrain from performing a context setup procedure for the UE 102 after receiving 309 the Initial UL RRC Message Transfer. Events 304 and 309 may collectively be referred to as procedure 381.

Next, FIG. 3D illustrates a scenario 300D involving the UE 102, operating in an inactive state, initiating early data transmission with the base station 104 including a CU 172 and a DU 174. Unlike scenario 300A, the UE 102 in scenario 300D transmits the UL data packet to the DU 174 in multiple segments in respective uplink MAC PDUs. Events in scenario 300D similar to those discussed above are labeled with similar reference numbers. The differences between the scenarios of FIG. 3A and FIG. 3D are discussed below.

In some embodiments, the UE 102 in an inactive state may transmit a UL data packet as multiple segments in respective PDUs rather than in a single PDU. In particular, the UE 102 may transmit 320 M UL MAC PDUs to the DU 174. In some embodiments, the UE 102 may transmit 305 a first UL MAC PDU to the DU 174 including a UL RRC message and/or a first segment of the UL data packet, and may transmit 220 a second through a final (e.g., M-th) data packet segment in different respective UL MAC PDUs. In further embodiments, the UE 102 may transmit 320 the UL RRC message in the final (e.g., M-th) UL MAC PDU with the final (e.g., M-th) segment of the UL data packet.

In some embodiments, after the DU 174 receives the segments of the UL data packet, the DU 174 assembles 322 the segments to obtain the entire UL data packet prior to forwarding the UL data packet to the CU 172. As one alternative, the DU 174 may forward the received segments to the CU 172, and the CU 172 may assemble the segments to obtain the UL data packet. As another alternative, the DU 174 can forward the M segments of the UL data packet in N DU-to-CU messages, where M>N or M<N. Events 304, 320, 322, 306, and 308 may be collectively referred to as procedure 382.

Figure 3E:
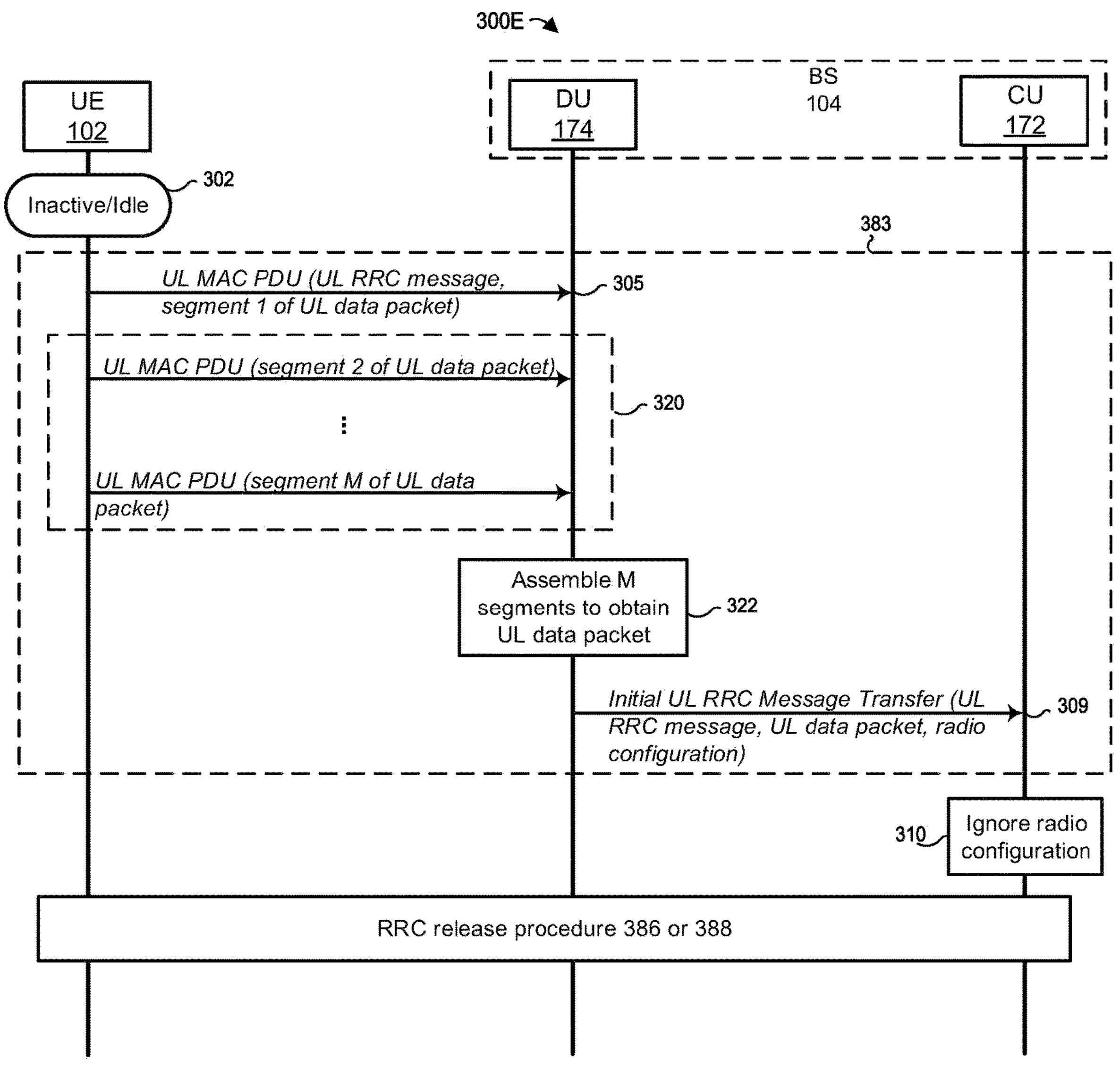
FIG. 3E illustrates a scenario similar to that of FIG. 3D, but in which the DU generates a message that includes a radio configuration that the CU subsequently ignores.

Next, FIG. 3E illustrates a scenario 300E involving the UE 102, operating in an inactive state, initiating early data transmission with the base station 104 including a CU 172 and a DU 174. Scenario 300E is similar to scenario 300C, but in which the UE 102 transmits the UL data packet to the DU 174 via multiple segments in respective uplink MAC PDUs. Events in scenario 300E similar to those discussed above are labeled with similar reference numbers. The differences between the scenarios of FIG. 3C and FIG. 3E are discussed below.

In some embodiments, the UE 102 in an inactive state may transmit a UL data packet as multiple segments in respective PDUs rather than in a single PDU. In some implementations, the UE 102 may transmit 320 M UL MAC PDUs to the DU 174. In some embodiments, the UE 102 may transmit 305 a first UL MAC PDU to the DU 174 including a UL RRC message and/or a first segment of the UL data packet and may transmit 220 a second through a final (e.g., M-th) data packet segment in individual UL MAC PDU messages. In further embodiments, the UE 102 may transmit 320 the UL RRC message in the final (e.g., M-th) UL MAC PDU with the final (e.g., M-th) segment of the UL data packet.

Similar to the procedure 382, the DU 174 can assemble and/or forward the segments to the CU 172 in any suitable manner. Events 304, 320, 322, and 309 may be collectively referred to as procedure 383.

Figures 3F, 3G:
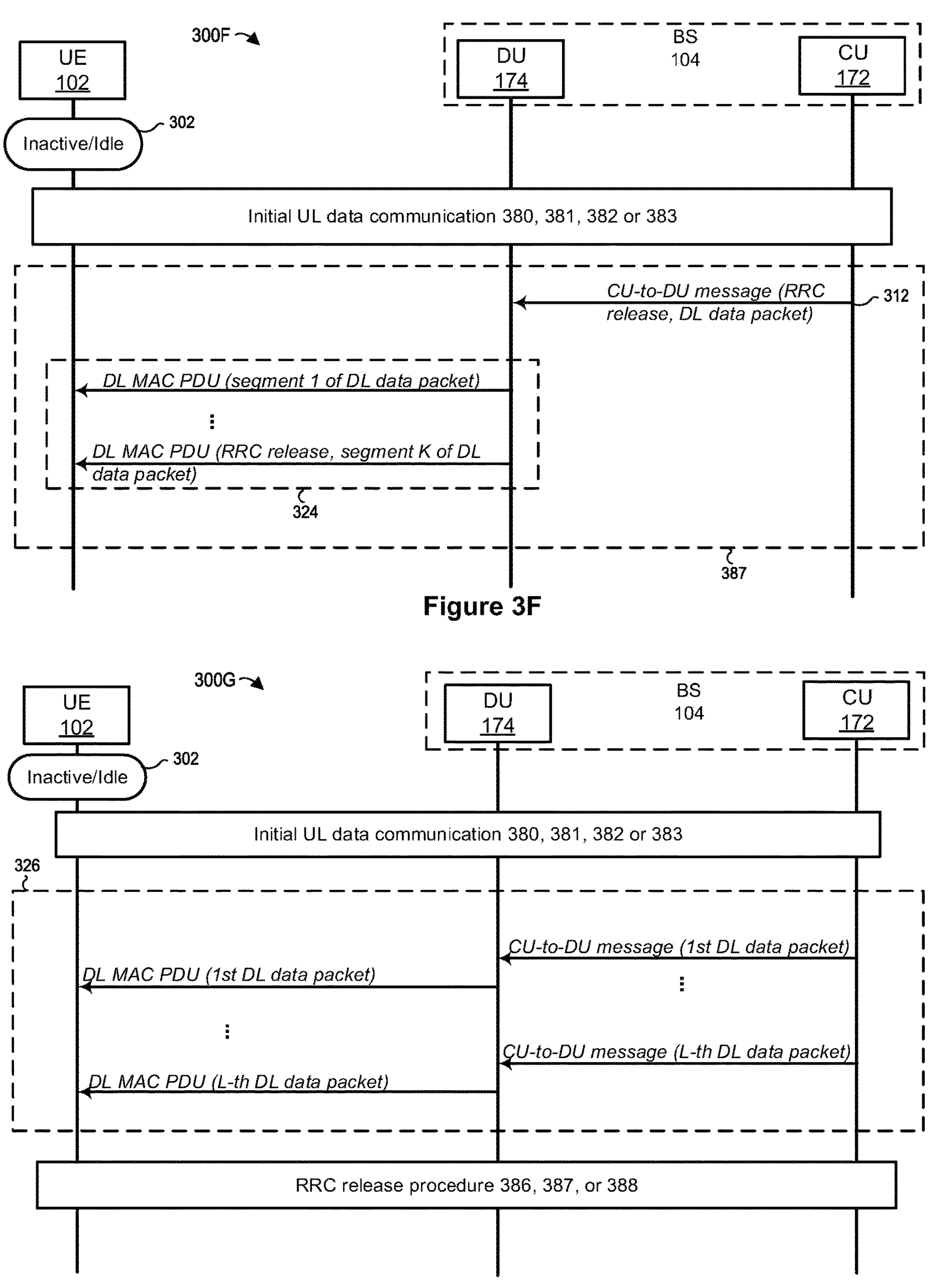
FIG. 3F illustrates a scenario similar to that of FIG. 3A, but in which the DU transmits, to the UE, a downlink data packet as multiple segments in respective DL PDUs, and includes an RRC release command in one of the DL PDUs.
FIG. 3G illustrates a scenario similar to that of FIG. 3A, but in which the DU transmits, to the UE, a downlink data packet as multiple segments in respective DL PDUs, and separately provides an RRC release command to the UE.

Next, FIG. 3F illustrates a scenario 300F involving the UE 102, operating in an inactive state, initiating early data transmission with the base station 104 including a CU 172 and a DU 174. Scenario 300F is similar to scenario 300A, except that here the DU 174 transmits, to the UE 102, a DL data packet as multiple segments in respective DL PDUs, and includes an RRC release command in one of the DL PDUs. Events in scenario 300F similar to those discussed above are labeled with similar reference numbers. The differences between the scenarios of FIG. 3A and FIG. 3F are discussed below.

In some embodiments, the DU 174 may transmit a DL data packet as multiple segments in respective PDUs rather than in a single PDU. In some implementations, the DU 174 may transmit 320 K DL MAC PDUs to a UE 102 in an inactive state. In some embodiments, the DU 174 may transmit 324 an RRC release message in the final (e.g., K-th) DL MAC PDU with the final (e.g., K-th) segment of the UL data packet. Events 312 and 324 may be collectively referred to as event 387.

FIG. 3G illustrates a scenario 300G involving the UE 102, operating in an inactive state, initiating early data transmission with the base station 104 including a CU 172 and a DU 174. Scenario 300G is similar to scenario 300A, except that here the DU 174 transmits, to the UE 102, a DL data packet as multiple segments in respective DL PDUs, and separately provides an RRC release command to the UE. Events in scenario 300G similar to those discussed above are labeled with similar reference numbers. The differences between the scenarios of FIG. 3A and FIG. 3G are discussed below.

In some embodiments, before beginning the RRC release procedure 386, 387, or 388, the CU 172 may transmit 326 L additional data packets to the UE 102. In some implementations, the CU 172 may transmit 326 the L additional data packets to the DU 174 in one or more respective CU-to-DU messages. In further implementations, each CU-to-DU message contains one DL data packet, and the DU 174 transmits 326 each DL data packet to the UE 102 in an inactive state by transmitting 326 a DL MAC PDU containing the respective DL data packet in response to receiving each CU-to-DU message. In still further implementations, the CU 172 may transfer all DL data packets to the DU 174 in one or more CU-to-DU messages before the DU 174 transmits 326 one or more DL MAC PDUs to the UE 102.

In some embodiments, the DL data packets may be segmented, and the CU-to-DU messages and/or DL MAC PDUs may contain one or more respective segments of the one or more DL data packets. In some implementations, the DU 174 may transmit each segment of the one or more DL data packets to the UE 102 in separate DL MAC PDUs.

Figure 3H:
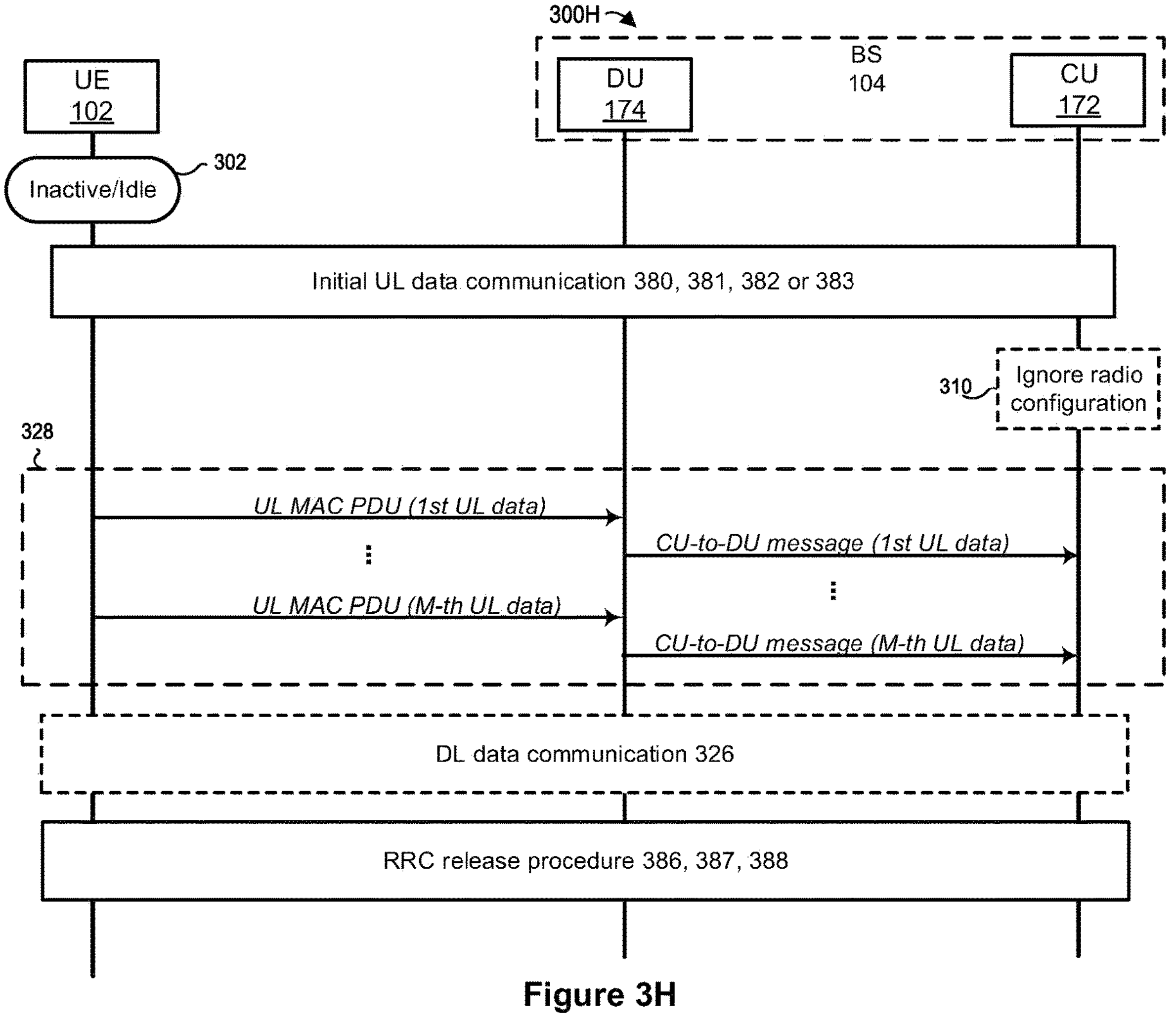
FIG. 3H illustrates a scenario similar to that of FIG. 3A, but in which the UE transmits additional uplink data packets to the CU via the DU, after the initial EDT.

Now referring to FIG. 3H, a scenario 300H involves the UE 102, operating in an inactive state, initiating early data transmission with the base station 104 including a CU 172 and a DU 174. Scenario 300H is similar to scenario 300A, except that here the UE 102 transmits additional UL data packets to the CU 172 via the DU 174, after the initial EDT. Events in scenario 300H similar to those discussed above are labeled with similar reference numbers. The differences between the scenarios of FIG. 3A and FIG. 3H are discussed below.

In some embodiments, before starting the RRC release procedure 386, 387, or 388, the UE 102 in an inactive state transmits 328 one or more data packets to the CU 172 via the DU 174. In some implementations, the UE 102 transmits 328 M UL data packets to the DU 174 using respective UL MAC PDUs, i.e., with each UL MAC PDU including one UL data packet. The DU 174 may transmit 328 each UL data packet in a respective CU-to-DU message in response to receiving each UL MAC PDU. In further implementations, the UE 102 transmits 328 the M UL data packets to the DU 174 in fewer than M UL MAC PDU messages. The DU 174 may transmit 328 each UL data packet upon receipt or may receive all M data packets before transmitting 328 the data packets.

In further embodiments, procedure 328 completes before DL data communication event 326. In still further embodiments, CU 172 receives a radio configuration some time before procedure 328 begins.

Figure 3I:
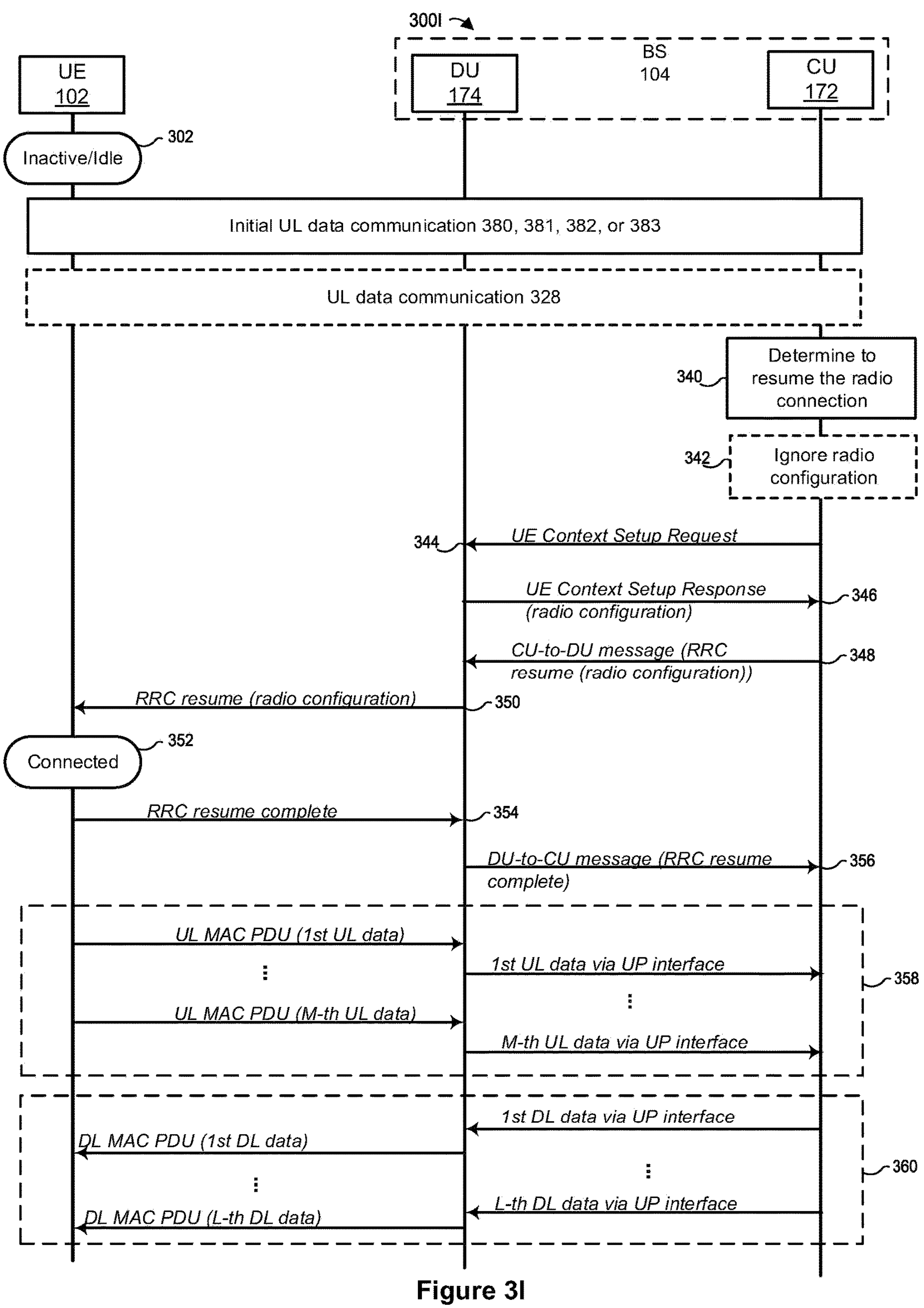
FIG. 3I illustrates a scenario similar to that of FIG. 3A, but in which the CU resumes a radio connection with the UE but performs a UE Context Setup procedure to generate a new radio configuration for the UE.

Next, FIG. 3I illustrates a scenario 300I, in which the UE 102, operating in an inactive state, initiates early data transmission with the base station 104. Scenario 300I is similar to scenario 300A, but here the CU 172 resumes a radio connection with the UE 102, and performs a UE Context Setup procedure to generate a new radio configuration for the UE. Events in scenario 300I similar to those discussed above are labeled with similar reference numbers. The differences between the scenarios of FIG. 3A and FIG. 3I are discussed below.

In some embodiments, the CU 172 may determine 340 the base station 104 should resume a radio connection with the UE 102 operating in an inactive state to transition the UE 102 to a connected state. In some implementations or scenarios, CU 172 may make the determination 340 in response to receiving a corresponding indication from the DU 174. In Alternatively, the CU 172 may make the determination 340 in response to receiving a threshold number of messages and/or a threshold quantity of data from the UE 102 operating in the inactive state via the DU 174. As yet another alternative, the CU 172 may make the determination 340 in response to receiving a message from the DU 174 that does not include an indication of early data transmission. Still further, the CU 172 may make the determination 340 based on the amount of data activity between the UE 102 and the CU 172. The CU 172 in some cases makes the termination 340 after the CU 172 receives 328 UL data communication from the UE 102 in the inactive state, via the DU 174.

In response to making the determination 340, the CU 172 may discard and/or ignore 342 a radio configuration received from the DU 174. In some embodiments, the CU 172 transmits 344 a UE Context Setup Request to the DU 174 in response to making the determination 340. In further embodiments, in response to receiving 344 the UE Context Setup Request, the DU 174 transmits 346 a UE Context Setup Response to the CU 172. In some implementations, the UE Context Setup Response includes at least a radio configuration for the UE 102.

In response to receiving 346 the UE Context Setup Response, the CU 172 may transmit 348 a CU-to-DU message. In some embodiments, the CU-to-DU message includes an RRC resume message including the radio configuration for the UE 102. The DU 174 may then transmit 350 the RRC resume message including the radio configuration to the UE 102. In response to receiving the RRC resume message, the UE 102 may then reestablish and/or resume 352 the radio connection with the BS 104.

Upon resuming 352 the radio connection, the UE 102 may subsequently transmit 354 a message to the DU 174 indicating that the RRC resume process is complete. In response, the DU 174 may transmit 356 a DU-to-CU message to the CU 172 including an indication that the RRC resume process is complete.

After the UE 102 has reestablished 352 the RRC connection, the UE 102 may begin transmitting data to the CU 172 via the DU 174. In some embodiments, the UE 102 transmits 358 one or more UL data packets and/or UL data packet segments to the CU 172 via the DU 174. In some implementations, the DU 174 may transmit 358 the one or more UL data packets and/or UL data packet segments to the CU 172 via a user plane (UP) interface. In further implementations, the DU 174 may transmit 358 the one or more UL data packets and/or UL data packet segments to the CU 172 via a control plane (CP) interface. In further embodiments, the UE 102 transmits 358 the one or more UL data packets and/or UL data packet segments to the DU 174 in one or more UL MAC PDUs, similar to event 328 of FIG. 3H but while in the RRC_CONNECTED state rather than an RRC_INACTIVE or RRC_IDLE state.

Similarly, after the UE 102 begins transmitting data to the CU 172 via the DU 174, the CU 172 may begin transmitting 360 data to the UE 102 via the DU 174. In some embodiments, the CU 172 transmits 360 one or more DL data packets and/or DL data packet segments to the UE 102. In some implementations, the CU 172 transmits the one or more DL data packets and/or DL data packet segments to the DU 174 via a UP interface. In further implementations, the CU 172 may transmit 360 the one or more DL data packets and/or DL data packet segments to the CU 172 via a CP interface. In further embodiments, the DU 174 then transmits the one or more DL data packets and/or DL data packet segments to the UE 102 in one or more DL MAC PDUs, similar to event 326 of FIG. 3G but while in the RRC_CONNECTED state rather than an RRC_INACTIVE or RRC_IDLE state.

Figure 4:
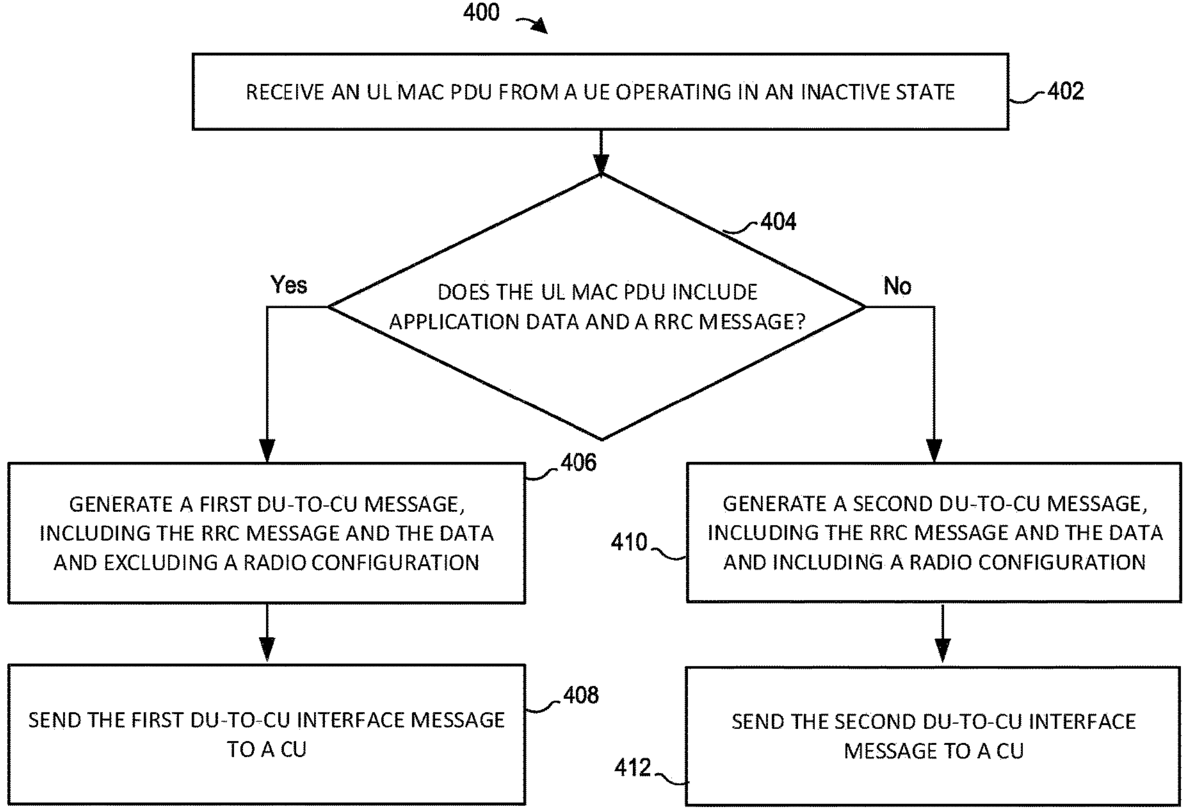
FIG. 4 is a flow diagram of an example method for determining whether to include a radio configuration in a message to a CU, based on whether an UL MAC PDU from a UE included both an uplink data packet and a radio resource message, which can be implemented in a DU.

Next, FIG. 4 depicts a flow diagram of an example method 400 for determining whether to include or exclude a radio configuration in a message to a CU 172 based on whether an UL MAC PDU from a UE 102 includes both an uplink data packet and a radio resource message, which can be implemented in a DU 174 of a BS 104 in a RAN 105.

At block 402, the DU 174 receives an UL MAC PDU from a UE 102 operating in an inactive state (e.g., event 304/305 of FIG. 3A-3I). Next, at block 404, the DU determines whether the received UL MAC PDU includes an uplink data packet and a radio resource message. In some embodiments, the uplink data packet may include application data for the UE 102. Depending on the implementation, the radio resource message may be an RRC resume message, an RRC setup message, an RRC early data transmission message, or any other suitable RRC message. If the UL MAC PDU does include an uplink data packet and a radio resource message, then at block 406 the DU 174 generates a first DU-to-CU message including the radio resource message and a data packet, but excluding a radio configuration (e.g., procedure 306 of FIGS. 3A, 3B, 3D and 3F-3I). At block 408, the DU 174 then transmits the first DU-to-CU message to the CU 172 (e.g., event 308 of FIGS. 3A, 3B, 3D, and 3F-3I).

If the UL MAC PDU does not include an uplink data packet and a radio resource message, then at block 410 the DU 174 generates a second DU-to-CU message including the radio resource message and a data packet as well as a radio configuration (e.g., FIGS. 3C and 3E-3I). At block 412, the DU 174 then transmits the second DU-to-CU message to the CU 172 (e.g., event 309 of FIGS. 3C and 3E-3I).

Figure 5:
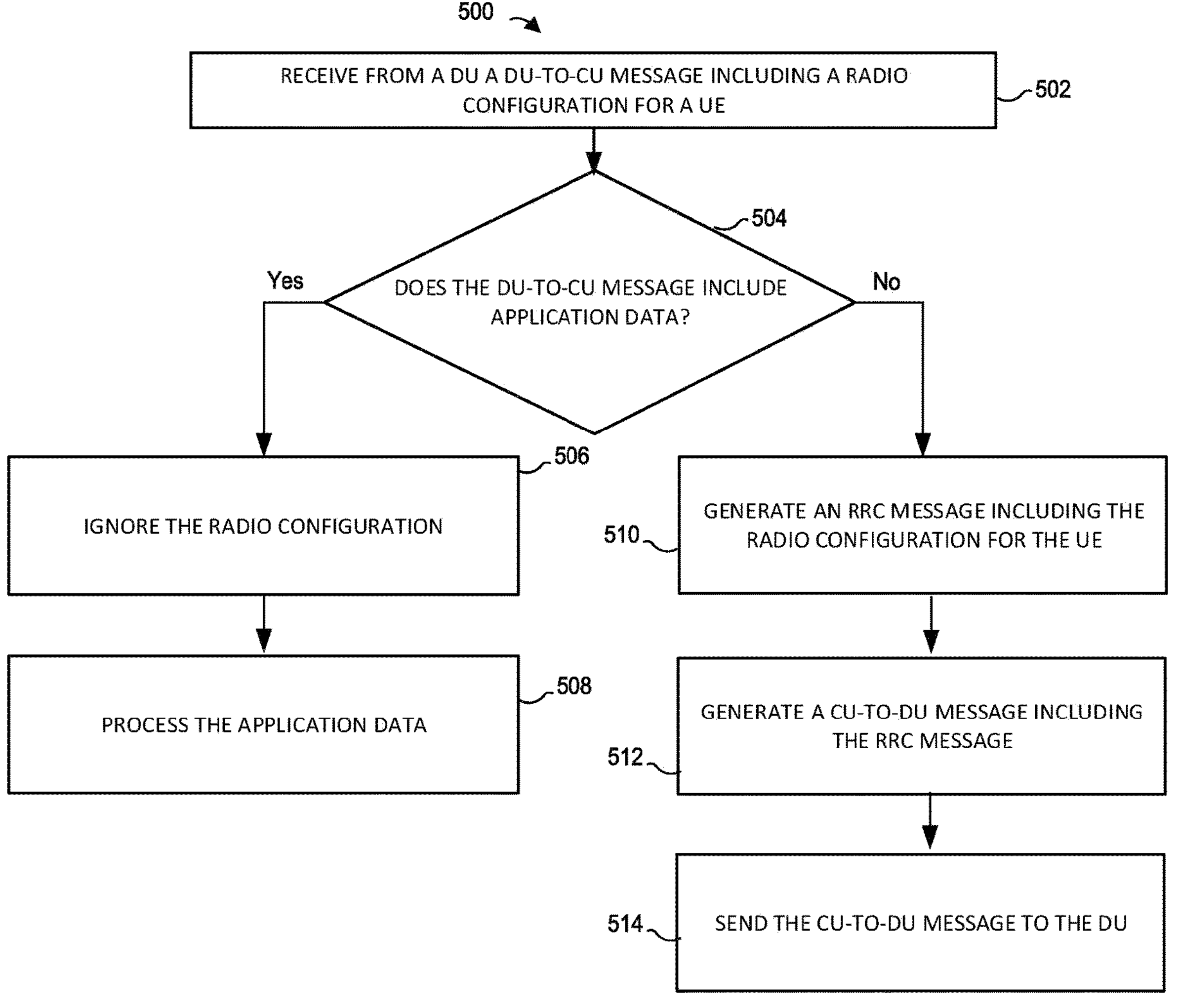
FIG. 5 is a flow diagram of an example method for determining whether to ignore (discard) a radio configuration for a UE, based on whether a message from the DU includes an uplink data, which can be implemented in a CU.

Next, FIG. 5 depicts a flow diagram of an example method 500 for determining whether a CU 172 should ignore a radio configuration for a UE 102, based on whether a message from a DU 174 includes an uplink data, which can be implemented in a CU 172 of a BS 104 in a RAN 105.

At block 502, the CU 172 receives a DU-to-CU message from a DU 174 including a radio configuration for a UE 102 (e.g., event 309 of FIGS. 3C and 3E-3I). Next, at block 504, the CU determines whether the DU-to-CU message includes uplink data. In some embodiments, the uplink data may be application data for the UE 102. If the DU-to-CE message does include uplink data, then at block 506 the CU 172 ignores the radio configuration received from the DU 174 (e.g., procedure 310 of FIGS. 3C and 3E-3I). The CU 172 then processes the uplink data at block 508.

If the DU-to-CU message does not include uplink data, then the CU 172 generates a radio resource message including the radio configuration for the UE 102 at block 510. At block 512, the CU 172 then generates a CU-to-DU message including the radio resource message and, at block 514, transmits the CU-to-DU message to the DU 174 (e.g., event 348 of FIG. 3I).

Figure 6:
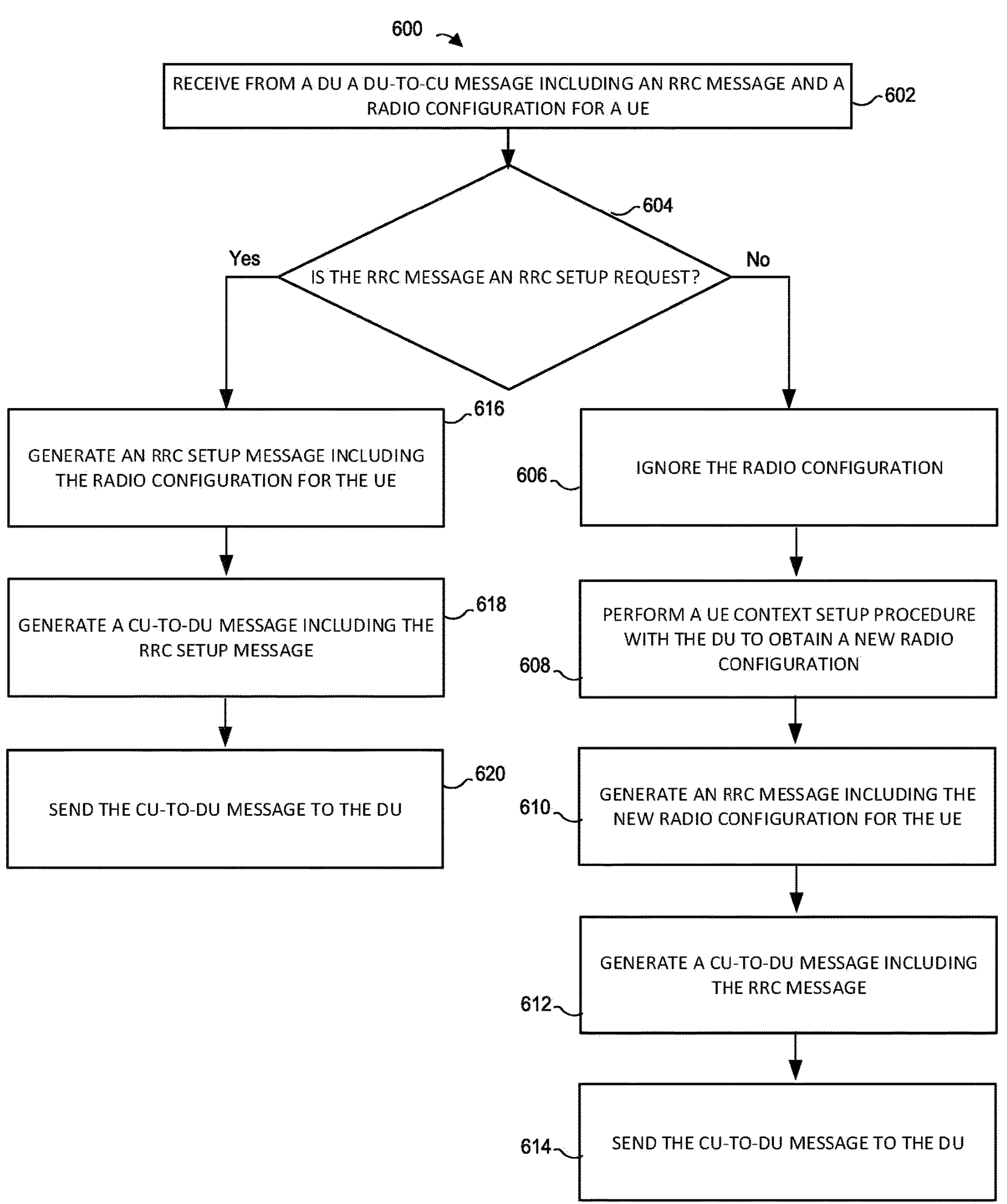
FIG. 6 is a flow diagram of an example method for determining whether to ignore (discard) a radio configuration for a UE, based on whether a message from the DU includes a request to set up a new radio connection, which can be implemented in a CU.

Next, FIG. 6 depicts a flow diagram of an example method 600 for determining whether a CU 172 should generate and send a message including an old radio configuration or a new radio configuration based on whether a message from a DU 174 includes a request to setup radio resources, which can be implemented in a CU 172 of a BS 104 in a RAN 105.

At block 602, a CU 172 receives a DU-to-CU message from a DU 174 including a radio resource message and a radio configuration for a UE 102. Next, at block 604, the CU 172 determines whether the radio resource message is an RRC setup request. If the radio resource message is not an RRC setup request, then at block 606 the CU 172 ignores the radio configuration (e.g., procedure 310 of FIGS. 3C and 3E-3I). The CU 172 then performs a UE context setup procedure with the DU 174 to obtain a new radio configuration (e.g., events 344 and 346 of FIG. 3I). At block 610, the CU 172 then generates a radio resource message including the new radio configuration for the UE 102. The CU 172 then, at block 612, generates a CU-to-DU message including the radio resource message and transmits the CU-to-DU message to the DU 174 at block 614 (e.g., event 348 of FIG. 3I).

If the radio resource message is an RRC setup request, then the CU 172 generates an RRC setup message including the radio configuration for the UE 102 at block 616. The CU 172 then generates a CU-to-DU message including the RRC setup message at block 618 and transmits, at block 620, the CU-to-DU message to the DU 174 (e.g., event 348 of FIG. 3I).

Figure 7:
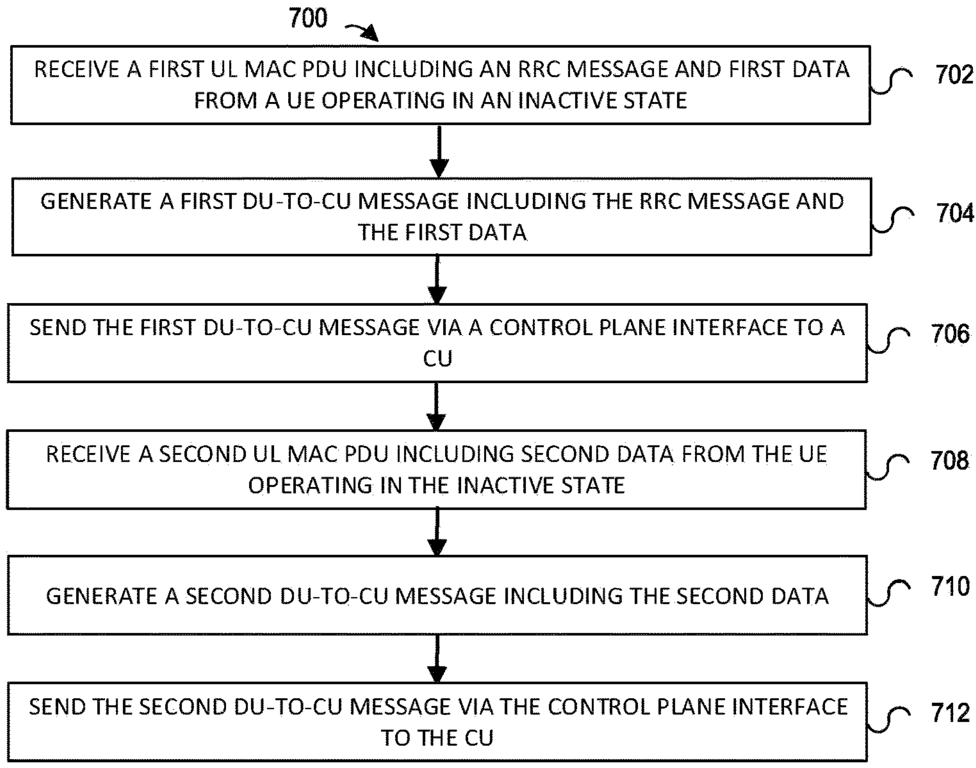
FIG. 7 is a flow diagram of an example method for transmitting uplink data packets to a CU via a control plane interface during an EDT, which can be implemented in a DU.

Next, FIG. 7 depicts a flow diagram of an example method 700 in which a DU 174 generates and transmits uplink data packets to a CU 172 via a control plane interface, which can be implemented in a DU 174 of a BS 104 in a RAN 105.

At block 702, the DU 174 receives a first UL MAC PDU including an uplink message and a first data packet from a UE 102 operating in an inactive state (e.g., event 304/305 of FIG. 3A-3I). In some embodiments, the uplink message is an RRC message. Next, at block 704, the DU 174 generates a first DU-to-CU message including the uplink message and the first data packet (e.g., procedure 306 of FIGS. 3A, 3B, 3D, and 3F-3I). The DU 174 then, at block 706, transmits the first DU-to-CU message to the CU 172 via a CP interface (e.g., events 308/309 of FIG. 3A-3I; event 328 of FIG. 3H; event 358 of FIG. 3I).

Next, at block 708, the DU 174 receives a second UL MAC PDU including a second data packet from the UE 102 operating in the inactive state (e.g., event 320 of FIG. 3D-3I; event 328 of 3H-3I; event 358 of FIG. 3I). In response and at block 710, the DU 174 generates a second DU-to-CU message including the second data packet and, at block 712, transmits the second DU-to-CU message via the CP interface to the CU 172 (e.g., event 328 of FIG. 3H-3I; event 358 of FIG. 3I).

Figure 8:
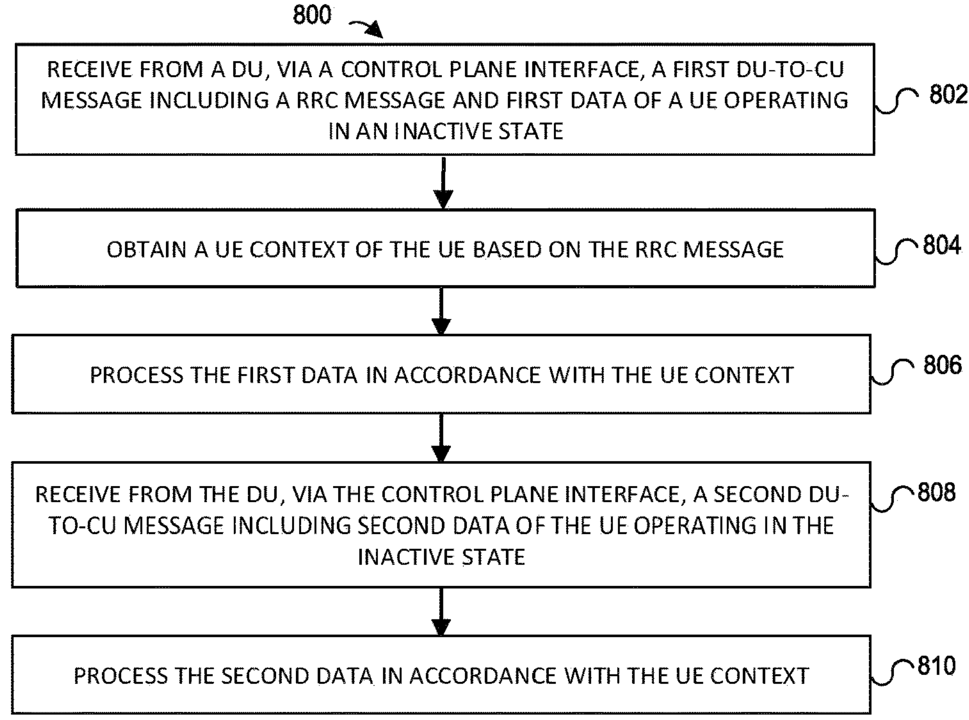
FIG. 8 is a flow diagram of an example method in which a CU receives a request to resume a radio connection during an EDT and obtains a UE context from the DU.

Next, FIG. 8 depicts a flow diagram of an example method 800 in which a CU 172 receives a request to resume a radio connection during an early data transmission (EDT), which can be implemented in a CU 172 of a BS 104 in a RAN 105.

At block 802, the CU 172 receives, from a DU 174 and via a CP interface, a first DU-to-CU message including an RRC message (e.g., an RRC resume request) and a first data packet of a UE 102 operating in an inactive state (e.g., events 308/309 of FIG. 3A-3I; event 328 of FIG. 3H-3I; event 358 of FIG. 3I). Next, at block 804, the CU 172 obtains a UE context for the UE 102 based on the RRC message (e.g., events 344 and 346 of FIG. 3I). At block 806, the CU 172 processes the first data packet using the UE context. Next, at block 808, the CU 172 receives a second DU-to-CU message from the DU 174 and via the CP interface, including a second data packet of the UE 102 operating in the inactive state (e.g., event 328 of FIG. 3H-3I; event 358 of FIG. 3I). Subsequently, the CU 172 processes the second data packet in accordance with the UE context.

Figure 9:
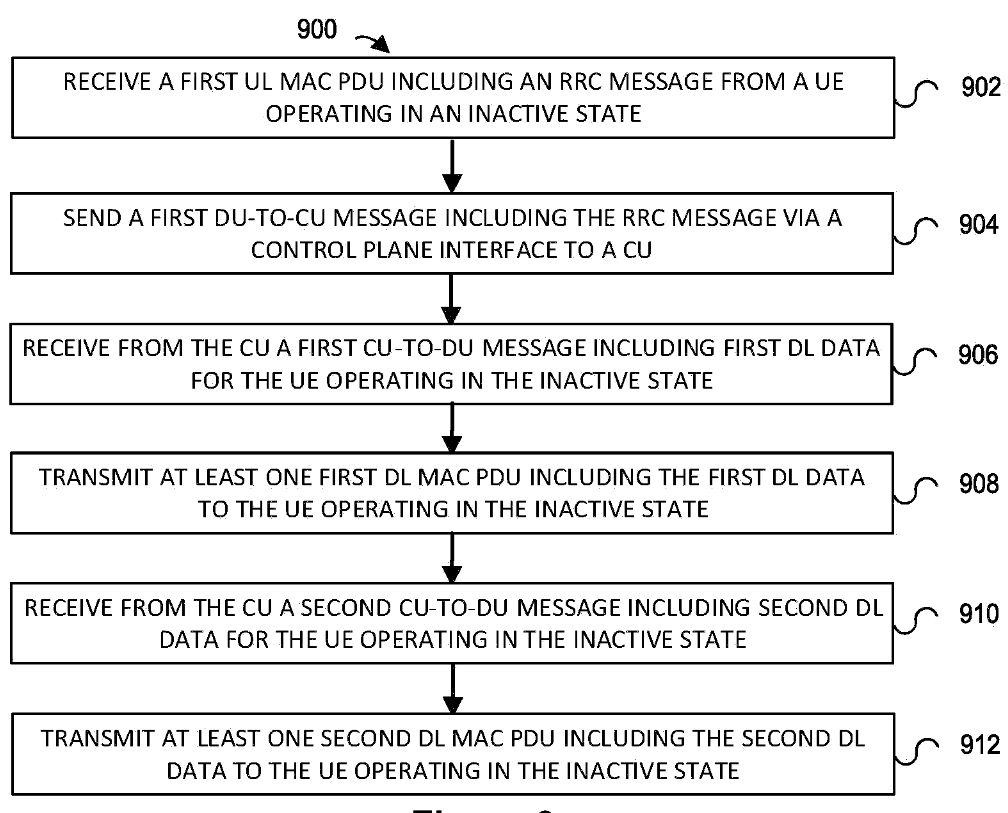
FIG. 9 is a flow diagram of an example method for transmitting multiple downlink data packets to a UE during an EDT, which can be implemented in a DU.

Next, FIG. 9 depicts a flow diagram of an example method 900 in which a DU 174 transmits multiple DL data packets to a UE 102 during an early data transmission (EDT), which can be implemented in a DU 174 of a BS 104 in a RAN 105.

At block 902, the DU 174 receives a first UL MAC PDU including an uplink message from a UE 102 operating in an inactive state (e.g., event 304/305 of FIG. 3A-3I). In some embodiments, the uplink message may be an RRC message. Next, at block 904, the DU 174 transmits a first DU-to-CU message including the uplink message via a control plane interface to a CU 172 (e.g., events 308/309 of FIG. 3A-3I). The DU 174 then receives, at block 906, a first CU-to-DU message from the CU 172 (e.g., via the control plane interface), including a first DL data packet for the UE 102 (e.g., event 312 of FIG. 3A, 3C-3I; event 326 of FIG. 3G-3H; event 360 of FIG. 3I).

At block 908, the DU 174 then transmits at least one first DL MAC PDU including the first DL data packet to the UE 102 (e.g., event 314 of FIG. 3A, 3C-3I; event 326 of FIG. 3G-3H; event 360 of FIG. 3I). Subsequently, at block 910, the DU 174 then receives a second CU-to-DU message from the CU 172 (e.g., via the control plane interface), including a second DL data packet for the UE 102 (e.g., event 326 of FIG. 3G-3H; event 360 of FIG. 3I). Next, the DU 174 transmits at block 912 at least one second DL MAC PDU including the second DL data packet to the UE 102 (e.g., event 326 of FIG. 3G-3H; event 360 of FIG. 3I).

Figure 10:
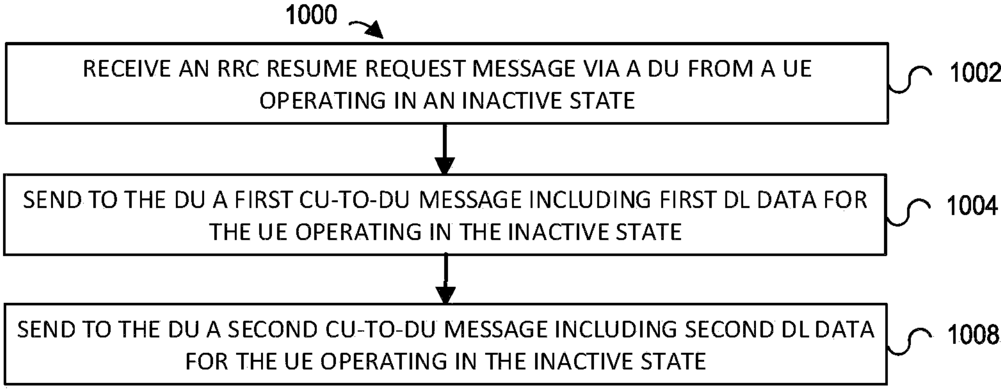
FIG. 10 is a flow diagram of an example method for transmitting multiple downlink data packets to the DU after receiving, from a UE via the DU, a request to resume a radio connection, which can be implemented in a CU.

Next, FIG. 10 depicts a flow diagram of an example method 1000 in which a CU 172 transmits multiple DL data packets to a DU 174 after receiving a request to resume a radio connection, which can be implemented in a CU 172 of a BS 104 in a RAN 105.

At block 1002, the CU 172 receives an uplink message from a UE 102 operating in an inactive state, via a DU 174 (e.g., event 308/309 of FIG. 3A-3I). In some embodiments, the uplink message is an RRC resume request. Next, at block 1004, the CU 172 transmits a first CU-to-DU message to the DU 174, including a first DL data packet for the UE 102 (e.g., event 312 of FIG. 3A, 3C-3I; event 326 of FIG. 3G-3H; event 360 of FIG. 3I). The CU 172 then, at block 1006, transmits to the DU 174 a second CU-to-DU message, including a second DL data packet for the UE 102 (e.g., event 312 of FIG. 3A, 3C-3I; event 326 of FIG. 3G-3H; event 360 of FIG. 3I).

Figure 11A:
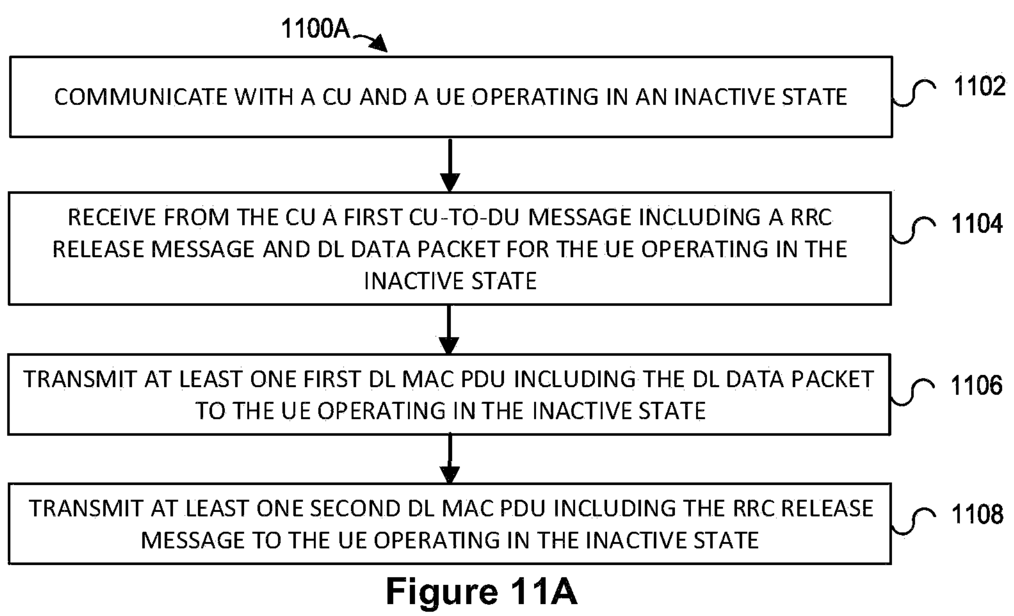
FIG. 11A is a flow diagram of an example method for transmitting multiple downlink data packets and a request to release the radio connection to the UE operating in an inactive or idle state, which can be implemented in a DU.

Next, FIG. 11A depicts a flow diagram of an example method 1100A in which a DU 174 transmits multiple downlink data packets and a request to release the radio connection to a UE 102, which can be implemented in a DU 174 of a BS 104 in a RAN 105.

At block 1102, the DU 174 communicates with a CU 172 and a UE 102 operating in an inactive state (e.g., processes 302 and 380/381/382/383 of FIG. 3A-3I). Next, at block 1104, the DU 174 receives a first CU-to-DU message from the CU 172, including an RRC release message and a DL data packet for the UE 102 (e.g., event 312 of FIG. 3A, 3C-3H). The DU 174 then transmits, at block 1106, at least one first DL MAC PDU including the DL data packet to the UE 102 (e.g., event 314 of FIG. 3A, 3C-3H). At block 1108, the DU 174 further transmits at least one second DL MAC PDU including the RRC release message to the UE 102 (e.g., event 314 of FIG. 3A, 3C-3H; FIG. 324 of FIG. 3F-3H).

Figure 11B:
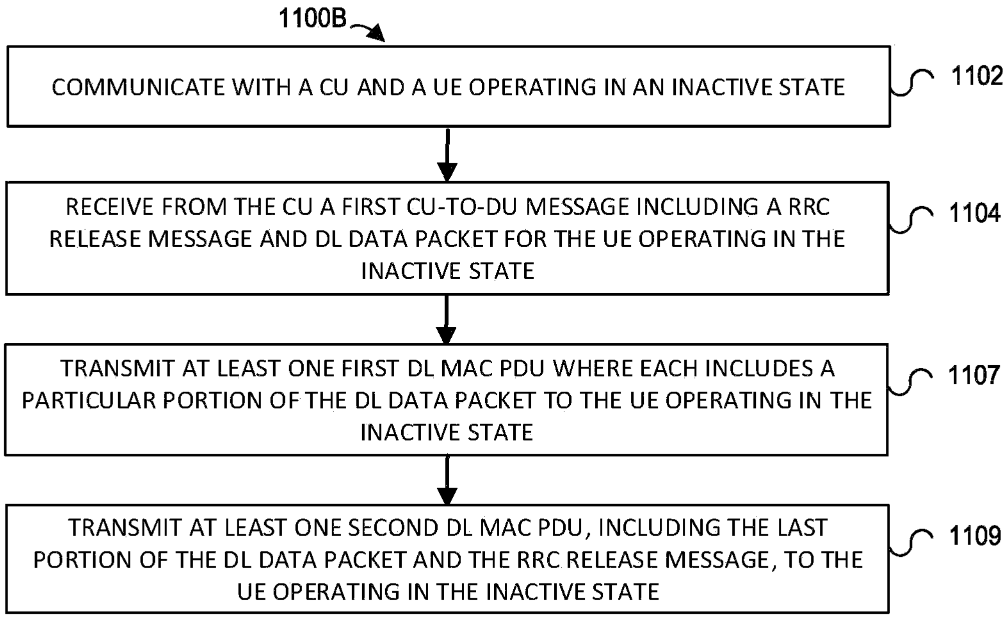
FIG. 11B is a flow diagram of a method similar to that of FIG. 11A, but with the DU includes both a segment of a data packet and an RRC command in a DL MAC PDU.

Next, FIG. 11B depicts a flow diagram of an example method 1100B similar to method 1100A of FIG. 11A, but in which the DU 174 transmits a single downlink data packet split into a plurality of segments, and in which the message that includes the final segment of the data packet further includes the radio resource message, which can be implemented in a DU 174 of a BS 104 in a RAN 105.

At block 1102, the DU 174 communicates with a CU 172 and a UE 102 operating in an inactive state (e.g., processes 302 and 380/381/382/383 of FIG. 3A-3I). Next, at block 1104, the DU 174 receives a first CU-to-DU message from the CU 172, including an RRC release message and a DL data packet for the UE 102 (e.g., event 312 of FIG. 3A, 3C-3H). The DU 174 then transmits, at block 1107, at least one first DL MAC PDU to the UE 102, where each DL MAC PDU includes a subset of the DL data packet (e.g., event 324 of FIG. 3F-3H). In some embodiments, the at least one DL data packet is separated into a plurality of DL data packet segments. At block 1109, the DU 174 further transmits at least one second DL MAC PDU to the UE 102, where the DL MAC PDU includes the final subset of the DL data packet and/or DL data packet segments as well as the RRC release message (e.g., event 324 of FIG. 3F-3H).

Figures 12, 13:
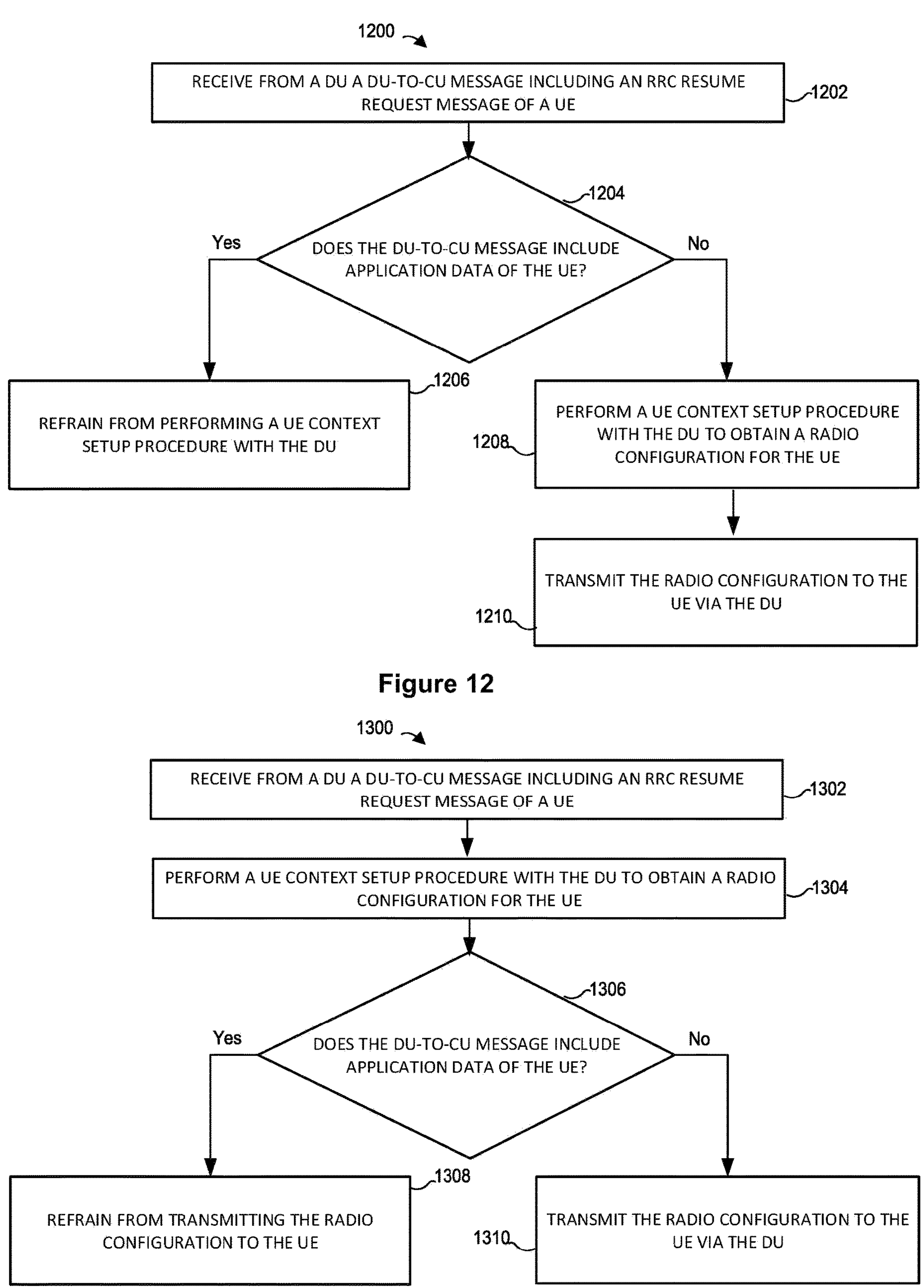
FIG. 12 is a flow diagram of an example method in which a CU determines whether to perform a UE context setup based on whether a message from a DU includes a data packet.
FIG. 13 is a flow diagram of an example method in which a CU determines whether to transmit a radio configuration to a UE based on whether a message from a DU includes a data packet.

Next, FIG. 12 depicts a flow diagram of an example method 1200 in which a CU 172 determines whether to perform a UE context setup based on whether a message from a DU 174 includes a data packet, which can be implemented in a CU 172 of a BS 104 in a RAN 105.

At block 1202, the CU 172 receives a DU-to-CU message from a DU 174, including an uplink message for a UE 102 (e.g., event 308/309 for FIG. 3A-3I). In the exemplary embodiment of FIG. 12, the uplink message is an RRC resume request. Next, at block 1204, the CU 172 determines whether the DU-to-CU message includes a data packet from the UE 102. In some embodiments, the data packet may be application data for the UE 102. If the DU-to-CU message does include a data packet, then the CU 172 refrains from performing a UE context setup procedure with the DU 174 at block 1206. If the DU-to-CU message does not include a data packet from the UE 102, then the CU 172 performs a UE context setup procedure with the DU 174 to obtain a radio configuration for the UE 102 at block 1208 (e.g., events 344/346 of FIG. 3I). Subsequently, at block 1210, the CU 172 transmits the radio configuration to the UE 102 via the DU 174 (e.g., event 348).

Next, FIG. 13 depicts a flow diagram of an example method 1300 in which a CU 172 determines whether to transmit a radio configuration to a UE 102 based on whether a message from a DU 174 includes a data packet, which can be implemented in a CU 172 of a BS 104 in a RAN 105.

At block 1302, the CU 172 receives a DU-to-CU message from the DU 174, including an uplink message from a UE 102 (e.g., event 308/309 of FIG. 3A-3I). In the exemplary embodiment of FIG. 13, the uplink message is an RRC resume request. Next, at block 1304, the CU 172 performs a UE context setup procedure with the DU 174 to obtain a radio configuration for the UE 102 (e.g., events 344/346 of FIG. 3I). At block 1306, then, the CU 172 determines whether the DU-to-CU message includes a data packet from the UE 102. In some embodiments, the data packet is application data for the UE 102. If the DU-to-CU message does include a data packet, then the CU 172 refrains from transmitting and discards the radio configuration to the UE 102 at block 1308. If the DU-to-CU message does include a data packet, then the CU 172 transmits the radio configuration to the UE 102 via the DU 174 at block 1310 (e.g., event 348 of FIG. 3I).

Figure 14A:
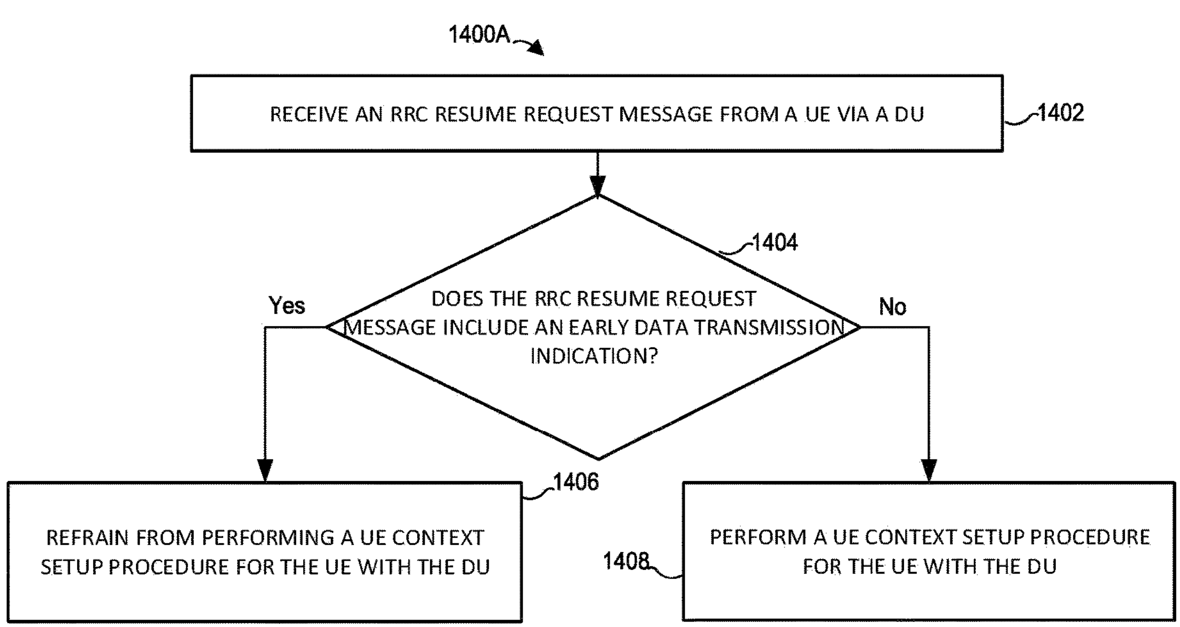
FIG. 14A is a flow diagram of an example method in which a CU determines whether to perform a UE context setup procedure based on whether a message from a DU includes an indication of early data transmission.

Next, FIG. 14A depicts a flow diagram of an example method 1400A in which a CU 172 determines whether to perform a UE context setup procedure based on whether a message from a DU 174 includes an indication of early data transmission, which can be implemented in a CU 172 of a BS 104 in a RAN 105.

At block 1402, the CU 172 receives an RRC resume request message from a UE 102 via a DU 174 (e.g., event 308/309 of FIG. 3A-3I). Next, at block 1404, the CU 172 determines whether the RRC resume request message includes an indication of early data transmission. If the RRC resume request message does include an early data transmission indication, then the CU 172 refrains from performing a UE context setup procedure for the UE 102 with the DU 174 at block 1406. If the RRC resume request message does not include an indication of early data transmission, the CU 172 performs a UE context setup procedure for the UE 102 with the DU 174 (e.g., events 344/346 of FIG. 3I).

Figure 14B:
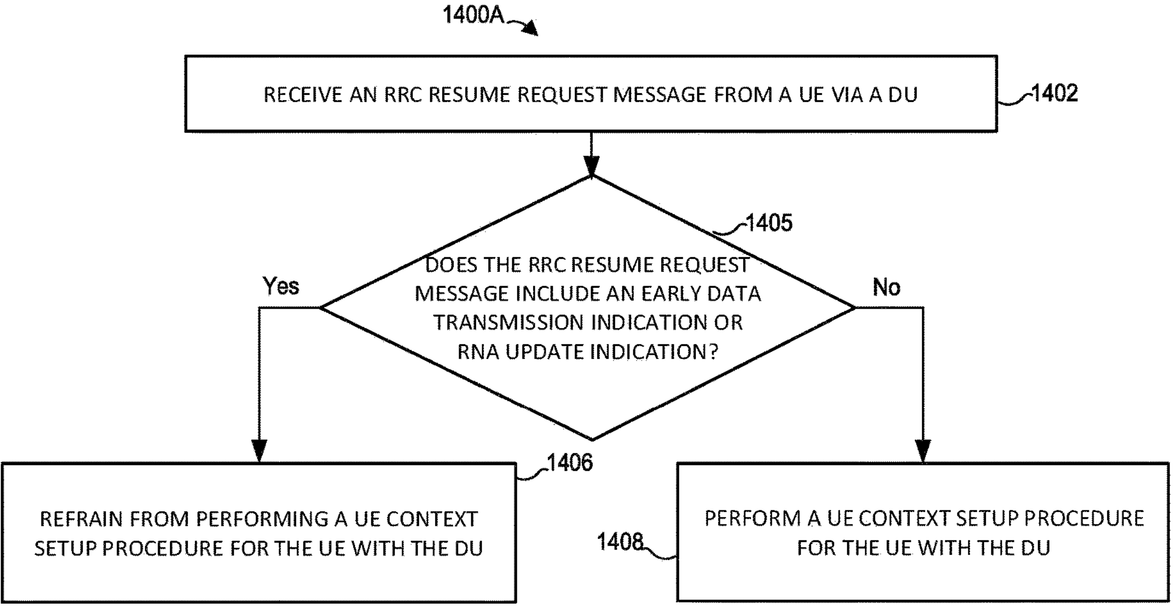
FIG. 14B is a flow diagram of an example method in which a CU determines whether to perform a UE context setup procedure based on whether a message from a DU includes either an indication of early data transmission or an indication of a RAN notification area (RNA) update.

Next, FIG. 14B depicts a flow diagram of an example method 1400B in which a CU 172 determines whether to perform a UE context setup procedure based on whether a message from a DU 174 includes either an indication of early data transmission or an indication of a RAN-based notification area (RNA) update, which can be implemented in a CU 172 of a BS 104 in a RAN 105.

At block 1402, the CU 172 receives an RRC resume request message from a UE 102 via a DU 174 (e.g., event 308/309 of FIG. 3A-3I). Next, at block 1405, the CU 172 determines whether the RRC resume request message includes an indication of EDT or an indication of an RNA update. If the RRC resume request message does include either an indication of EDT or indication of an RNA update, then the CU 172 refrains from performing a UE context setup procedure for the UE 102 with the DU 174 at block 1406. If the RRC resume request message includes neither an indication of EDT nor an indication of an RNA update, then the CU 172 performs a UE context setup procedure for the UE 102 with the DU 174 at block 1408 (e.g., events 344/346 of FIG. 3I). In some embodiments, the CU 172 determines whether the RRC resume request message includes an indication of both EDT and an RNA update.

Figure 15A:
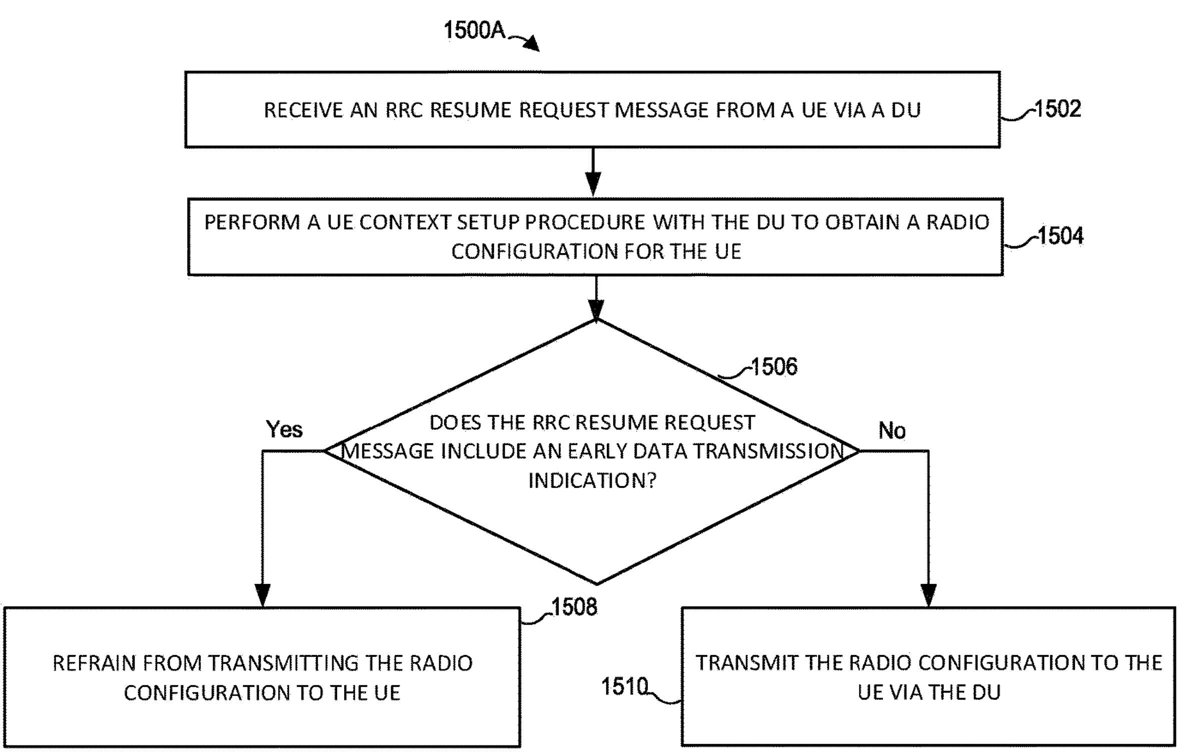
FIG. 15A is a flow diagram of an example method in which a CU determines whether to transmit a radio configuration to a UE based on whether a message from a DU includes an indication of early data transmission.

Next, FIG. 15A depicts a flow diagram of an example method 1500A in which a CU 172 determines whether to transmit a radio configuration to a UE 102 based on whether a message from a DU 174 includes an indication of early data transmission, which can be implemented in a CU 172 of a BS 104 in a RAN 105.

At block 1502, the CU 172 receives an RRC resume request message from a UE 102 via a DU 174 (e.g., event 308/309 of FIG. 3A-3I). Next, at block 1504, the CU 172 performs a UE context setup procedure with the DU 174 to obtain a radio configuration for the UE 102 (e.g., events 344/346 of FIG. 3I). Subsequently, the CU 172 determines at block 1506 whether the RRC resume request message includes an indication of early data transmission. If the RRC resume request message does include an indication of early data transmission, then the CU 172 refrains from transmitting and discards the radio configuration to the UE 102 at block 1508. If the RRC resume request message does not include an indication of early data transmission, then the CU 172 transmits the radio configuration to the UE 102 via the DU 174 at block 1510 (e.g., event 348 of FIG. 3I).

Figure 15B:
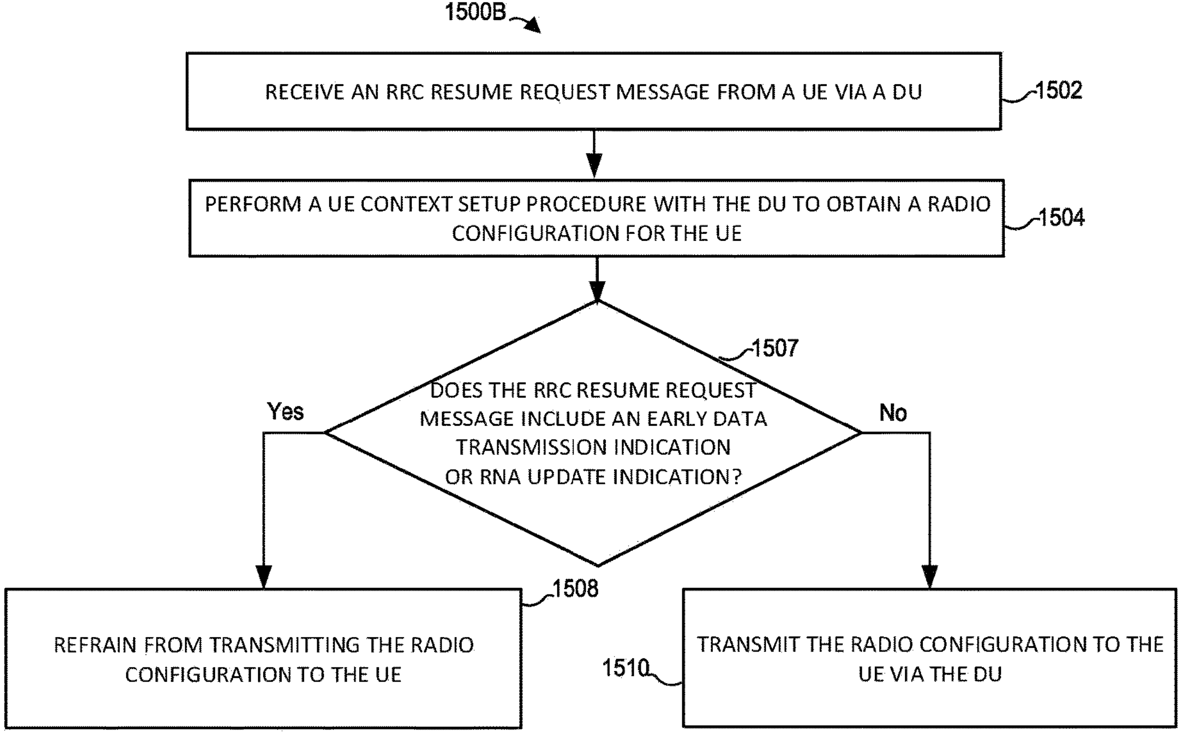
FIG. 15B is a flow diagram of an example method in which a CU determines whether to transmit a radio configuration to a UE based on whether a message from a DU includes either an indication of early data transmission or an indication of an RNA update.

Next, FIG. 15B depicts a flow diagram of an example method 1500B in which a CU 172 determines whether to transmit a radio configuration to a UE 102 based on whether a message from a DU 174 includes either an indication of early data transmission or an indication of a RAN-based notification area (RNA) update, which can be implemented in a CU 172 of a BS 104 in a RAN 105.

At block 1502, the CU 172 receives an RRC resume request message from a UE 102 via a DU 174 (e.g., event 308/309 of FIG. 3A-3I). Next, at block 1504, the CU 172 performs a UE context setup procedure with the DU 174 to obtain a radio configuration for the UE 102 (e.g., events 344/346 of FIG. 3I). Subsequently, the CU 172 determines at block 1507 whether the RRC resume request message includes an indication of EDT or an indication of an RNA update. If the RRC resume request message includes either an indication of EDT or an indication of an RNA update, then the CU 172 refrains from transmitting and discards the radio configuration to the UE 102 at block 1508. If the RRC request message includes neither an indication of EDT nor an indication of an RNA update, then the CU 172 transmits the radio configuration to the UE 102 via the DU 174 at block 1510 (e.g., event 348 of FIG. 3I). In some embodiments, the CU 172 determines whether the RRC resume request message includes an indication of one or both of an indication of EDT and an RNA update.

Figure 16:
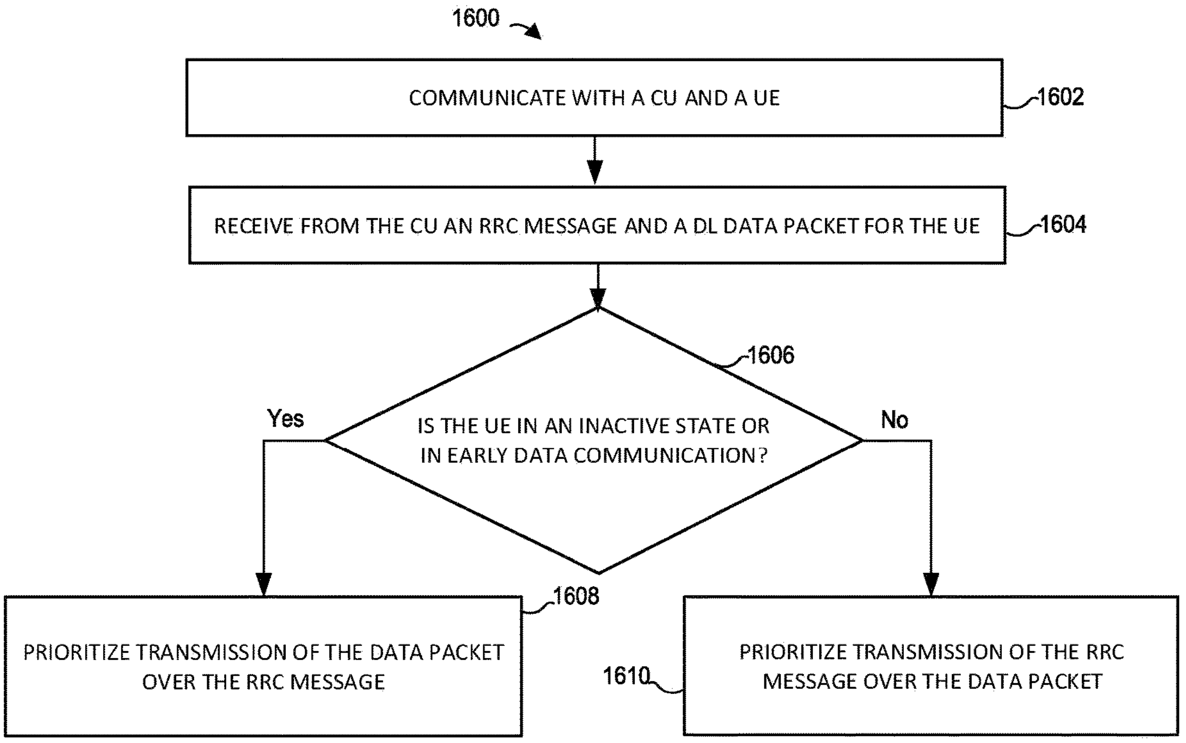
FIG. 16 is a flow diagram of an example method for determining relative priorities of a data packet and an RRC message based on whether the UE is operating in a connection state, which can be implemented in a DU.

Next, FIG. 16 depicts a flow diagram of an example method 1600 in which a DU 174 for determining relative priorities of a data packet and an RRC message based on whether the UE 102 is operating in a connected state, which can be implemented in a DU 174 of a BS 104 in a RAN 105.

At block 1602, the DU 174 communicates with a CU 172 and a UE 102 (e.g., processes 302 and 380/381/382/383 of FIG. 3A-3I). At block 1604, the DU 174 receives a message associated with a protocol for controlling radio resources and a DL data packet for the UE 102 from the CU 172 (e.g., event 312 of FIG. 3A, 3C-3H). In some embodiments, the message associated with a protocol for controlling radio resources may be an RRC message (e.g., an RRC resume message, an RRC setup message, etc.). Next, at block 1606, the DU 174 determines whether the UE is in early data communication or the radio connection between the UD 102 and the DU 174 is active—i.e., whether the UE 102 is in an inactive state. If the UE 102 is in an inactive state or in early data communication, the DU 174 prioritizes transmitting the data packet over the RRC message at block 1608 (e.g., event 314 of FIG. 3A, 3C-3H; event 324 of FIG. 3F-3H). For example, the DU 174 may not have sufficient radio resources to transmit the RRC message and the data packet in a DL MAC PDU. In this case, the DU 174 includes the data packet in the DL MAC PDU first. If there is some space in the DL MAC PDU, the DU 174 may include a portion of the RRC message in the DL MAC PDU. Alternatively, the DU 174 does not include the RRC message in the DL MAC PDU. If the UE 102 is neither in an inactive state nor in early data communication (i.e., the UE 102 is in a connected state), then the DU 174 prioritizes transmitting the RRC message over the data packet at block 1610. For example, the DU 174 may not have sufficient radio resources to transmit the RRC message and the data packet in a DL MAC PDU. In this case, the DU 174 includes the RRC message in the DL MAC PDU first. If there is space in the DL MAC PDU, the DU 174 may include a segment of the data packet in the DL MAC PDU. Alternatively, the DU 174 does not include the data packet in the DL MAC PDU.

Figure 17:
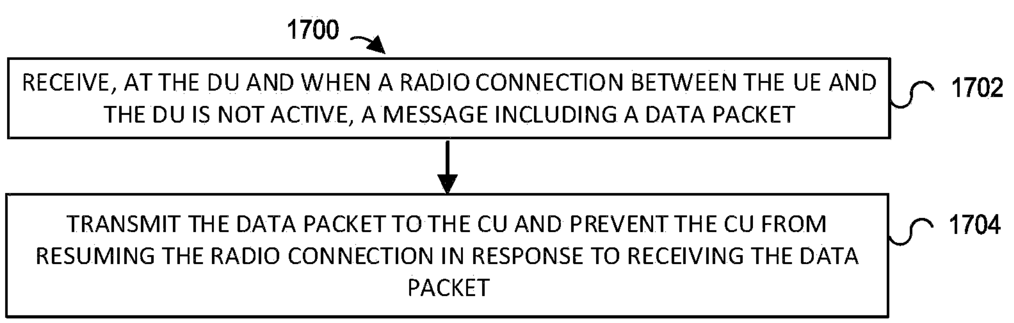
FIG. 17 is a flow diagram of an example method for processing an EDT, which can be implemented in a DU.

Next, FIG. 17 depicts a flow diagram of an example method 1700 in which a DU 174 receives a message including a data packet when a connection between the DU 174 and a UE 102 is inactive, and the DU 174 transmits the data packet to the CU 172, preventing the CU 172 from resuming radio connection, which can be implemented in a DU 174 of a BS 104 in a RAN 105.

At block 1702, the DU 174 receives, when a radio connection between the UE 102 and the DU 174 is not active, a message including a data packet (e.g., event 304/305 of FIG. 3A-3I). Next, at block 1704, the DU 174 transmits the data packet to the CU 172, including preventing the CU 172 from resuming the radio connection in response to receiving the data packet (e.g., events 306/308 of FIG. 3A, 3B, 3D, 3F-3I; events 309/310 of FIG. 3C, 3E-3I).

Figure 18:
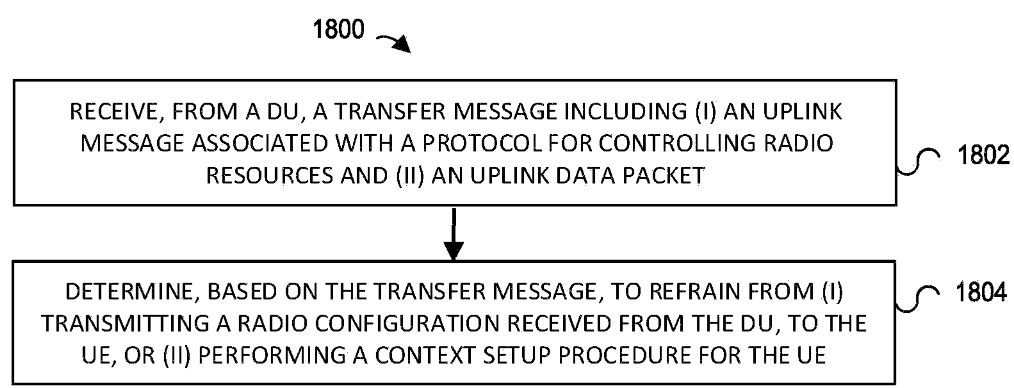
FIG. 18 is a flow diagram of an example method for processing an EDT, which can be implemented in a CU.

Next, FIG. 18 depicts a flow diagram of an example method 1800 in which a CU 172 receives a transfer message an uplink message and an uplink data packet, which can be implemented in a CU 172 of a BS 104 in a RAN 105.

At block 1802, the CU 172 receives, from a DU 174, a transfer message including (i) an UL message associated with a protocol for controlling radio resources and (ii) an UL data packet. Next, at block 184, the CU 172 determines, based on the transfer message, to refrain from (i) transmitting a radio configuration received from the DU 174 to the UE 102 or (ii) performing a context setup procedure for the UE 102.

The following list of examples reflects a variety of the embodiments explicitly contemplated by the present disclosure:

Example 1. A method, in a distributed unit (DU) of a distributed base station, for managing early data transmission (EDT) from a UE, the method comprising: receiving, by processing hardware and when a radio resource control connection between the UE and the DU is not active, an uplink data packet from the UE; and transmitting, by the processing hardware, the uplink data packet to the central unit (CU) of the distributed base station, while preventing the CU from activating the radio connection in response to the uplink data packet.

Example 2. The method of example 1, wherein the preventing includes: excluding, from an uplink transfer message in which the uplink data packet is transmitted to the CU, a radio configuration for the UE.

Example 3. The method of example 2, wherein the transmitting includes: transmitting the uplink transfer message over a control-plane interface between the DU and the CU.

Example 4. The method of example 2, wherein the transmitting includes: transmitting the uplink transfer message over a user-plane interface between the DU and the CU.

Example 5. The method of any of the preceding examples, further comprising: determining, by the processing hardware and based at least in part on a message in which the uplink data packet was received from the UE, to prevent the CU from activating the radio connection in response to the uplink data packet.

Example 6. The method of example 5, wherein the determining is based on whether the message includes an EDT indication.

Example 7. The method of example 5, wherein the determining is further based on whether the message includes both (i) the uplink data packet, and (ii) a radio resource control (RRC) message.

Example 8. The method of example 7, wherein the RRC message is an RRC resume request.

Example 9. The method of example 7, wherein the RRC message is an RRC setup request.

Example 10. The method of example 7, wherein the RRC message is an RRC early data request.

Example 11. The method of any of the preceding examples, wherein receiving the uplink data packet includes receiving a plurality of message segments or data packet segments in a respective plurality of messages.

Example 12. The method of example 11, wherein each of the plurality of messages is an uplink (UL) media access layer (MAC) protocol data unit (PDU).

Example 13. The method of example 11 or 12, further comprising: assembling, by the processing hardware, the plurality of message segments or data packet segments into the uplink data packet prior to transmitting the uplink data packet to the CU.

Example 14. The method of any of the preceding examples, further comprising: receiving, by the processing hardware from the CU and subsequently to transmitting the uplink data packet, a release command associated with a protocol for controlling radio resources; and transmitting, by the processing hardware, the release command to the UE.

Example 15. The method of example 14, wherein the release command is contained in a command to release a context for the UE.

Example 16. The method of example 14, wherein the release command is contained in a command to modify a context for the UE.

Example 17. The method of example 14, wherein the release command is contained in a DL RRC transfer message.

Example 18. The method of any of examples 14-17, including: receiving, by the processing hardware from the CU, a downlink data packet addressed to the UE; and transmitting the downlink data packet to the UE.

Example 19. The method of example 18, including transmitting the release command and the downlink data packet in a same DL MAC PDU.

Example 20. The method of example 18, including: transmitting the release command in a first DL MAC PDU, and transmitting the downlink data packet in a second DL MAC PDU.

Example 21. The method of example 18, wherein: transmitting a first portion of the downlink data packet in a first DL MAC PDU, and transmitting a second portion of the downlink data packet and the release command in a second DL MAC PDU.

Example 22. The method of any of the preceding examples: receiving, by the processing hardware and prior to receiving a release command from the CU, a downlink data packet; and transmitting, by the processing hardware, the downlink data packet to the UE.

Example 23. The method of example 22, wherein transmitting the downlink data packet includes transmitting a plurality of segments of the downlink data packet in respective DL MAC PDUs.

Example 24. The method of any of examples 1-17, further comprising: receiving, by the processing hardware from the CU, (i) a message associated with a protocol for controlling radio resources, and (ii) a downlink data packet; and in response to determining that the radio connection between the UE and the DU is not active, prioritizing transmission of the downlink data packet to the UE over transmission of the message to the UE.

Example 25. The method of any of the preceding examples, wherein: the DU operates as an integrated access and mobility (IAB)-node, and the CU operates as an IAB-donor.

Example 26. A method, in a central unit (CU) of a distributed base station, for managing data transmission from a UE, the method comprising: receiving, by processing hardware from a DU, a transfer message including (i) an uplink message associated with a protocol for controlling radio resources and related to a UE, and (ii) at least a portion of an uplink data packet from the UE; processing, by the processing hardware, the at least a portion of the uplink data packet; and determining, based on the transfer message, to refrain from at least one of: transmitting, to the UE, a radio configuration received from the DU, or performing a context setup procedure for the UE.

Example 27. The method of example 26, including determining to refrain from transmitting, to the UE, the radio configuration received from the DU.

Example 28. The method of example 27, including: discarding the radio configuration in response to determining that the transfer message includes the uplink message, the uplink data, and the radio configuration.

Example 29. The method of example 27, including: discarding the radio configuration in response to determining that the uplink message is a request to set up a new radio connection.

Example 30. The method of example 27, including, when the uplink message is a request to resume a radio connection between the UE and the DU: performing the context setup procedure to obtain, from the DU, the radio configuration for the UE; and discarding the radio configuration in response to determining that the transfer message includes the at least a portion of the uplink data packet.

Example 31. The method of example 27, wherein: the determining to refrain from transmitting the radio configuration to the UE is in response to determining that the uplink message includes an EDT indication.

Example 32. The method of example 27, wherein: the determining to refrain from transmitting the radio configuration to the UE is in response to determining that the uplink message includes a RAN-based notification area (RNA) update indication.

Example 33. The method of example 26, including determining to refrain from performing the context setup procedure.

Example 34. The method of example 33, wherein: the determining to refrain from transmitting the radio configuration to the UE is in response to determining that the uplink message includes an EDT indication.

Example 35. The method of example 33, wherein: the determining to refrain from transmitting the radio configuration to the UE is in response to determining that the uplink message includes a RAN-based notification area (RNA) update indication.

Example 36. The method of any of examples 26-35, further comprising: transmitting, to the UE via the DU and subsequently to receiving the at least a portion of the uplink data packet, a release command associated with a protocol for controlling radio resources.

Example 37. The method of example 36, wherein the release command is contained in one of: (i) a command to release a context for the UE, (ii) a command to modify a context for the UE, and (iii) a DL RRC transfer message.

Example 38. The method of any of examples 26-35: transmitting, to the DU and prior to transmitting a release command, a downlink data packet.

Example 39. The method of example 26, wherein: the uplink message is a request to resume a radio connection between the UE and the DU; the method further comprising: obtaining a UE context for the UE based on the request; and processing the at least a portion of the uplink data packet in accordance with the UE context.

Example 40. The method of any of examples 26-39, wherein the transfer message is an initial UL RRC message transfer request.

Example 41. A method, in a CU of a distributed base station, for managing a radio connection between the UE and the DU of the distributed base station, the method comprising: receiving, by processing hardware from the DU, a transfer message including (i) an uplink message associated with a protocol for controlling radio resources and related to a UE, and (ii) a radio configuration for the UE; in a first instance, in response to determining that the uplink message is a request to setup a new radio connection between the UE and the DU: configuring the new radio connection using the received radio configuration; and in a second instance, in response to determining that the uplink message is not a request to setup a new radio connection between the UE and the DU: discarding the received radio configuration.

Example 42. The method of example 41, further comprising, in the first instance: generating, by the processing hardware, a command to set up the new radio connection, the command associated with the protocol for controlling radio resources and including the radio configuration; and transmitting, by the processing hardware, the command to the UE via the DU.

Example 43. The method of example 42, wherein the command is RRC Setup.

Example 44. The method of example 41, further comprising, in the second instance: performing, by the processing hardware and with the DU, a context setup procedure for the UE, to obtain a new radio configuration for the UE; generating a downlink message associated with the protocol for controlling radio resources, the message the new radio configuration; and transmitting, by the processing hardware, the downlink message to the UE via the DU.

Example 45. A network node comprising processing hardware and configured to implement any of the preceding examples.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method, in a central unit (CU) of a distributed base station, for managing data transmission from a user equipment (UE), the method comprising:

receiving, from a distributed unit (DU), a transfer message including (i) an uplink message associated with a protocol for controlling radio resources and related to a UE, the uplink message including an early data transmission (EDT) indication, (ii) a radio configuration for the UE, and (iii) at least a portion of an uplink packet from the UE; and in response to the uplink message including the EDT indication, refraining from transmitting, to the UE, the radio configuration received from the DU.

2. The method of claim 1, the method further including:

discarding the radio configuration in response to determining that the uplink message is a request to set up a new radio connection.

3. The method of claim 2, the method further including, when the uplink message is a request to resume a radio connection between the UE and the DU:

performing a context setup procedure to obtain, from the DU, the radio configuration for the UE; and discarding the radio configuration in response to determining that the transfer message includes the at least the portion of the uplink data packet.

4. The method of claim 1, further comprising:

transmitting, to the UE via the DU and subsequently to receiving the at least a portion of the uplink data packet, a release command associated with the protocol for controlling radio resources.

5. The method of claim 4, wherein the release command is contained in one of:

(i) a command to release a context for the UE, (ii) a command to modify a context for the UE, and (iii) a DL RRC transfer message.

6. The method of claim 1, further comprising:

transmitting, to the DU and prior to transmitting a release command, a downlink data packet.

7. The method of claim 1, the method further including:

processing the at least the portion of the uplink data packet.

8. The method of claim 1, wherein the transfer message is an initial UL RRC message transfer request.

9. The method of claim 7, wherein:

the uplink message is a request to resume a radio connection between the UE and the DU;

the method further comprising:

obtaining a UE context for the UE based on the request; and processing the at least a portion of the uplink data packet in accordance with the UE context.

10. The method of claim 1, the method further comprising:

in response to the uplink message including the EDT indication, refraining from performing a context setup procedure for the UE.

11. A method, in a distributed unit (DU) of a distributed base station, for managing early data transmission (EDT) from a UE, the method comprising:

receiving, when a radio resource control connection between the UE and the DU is not active, one or more messages from the UE; and transmitting, to a central unit (CU) of the distributed base station, a transfer message including (i) an uplink message associated with a protocol for controlling radio resources and related to a UE, the uplink message including an EDT indication, (ii) a radio configuration for the UE, and (iii) at least a portion of an uplink packet from the UE, while preventing, via the EDT indication, the CU from transmitting, to the UE, the radio configuration received from the DU.

12. The method of claim 11, wherein the uplink message is an initial UL RRC message transfer request.

13. The method of claim 11, wherein:

the DU operates as an integrated access and mobility (IAB)-node, and the CU operates as an IAB-donor.

14. A network node, operating as a central unit (CU) of a distributed base station, configured to manage data transmission from a user equipment (UE), the network node comprising:

a transceiver; and processing hardware configured to:

receive, from a distributed unit (DU), a transfer message including (i) an uplink message associated with a protocol for controlling radio resources and related to a UE, the uplink message including (ii) an early data transmission (EDT) indication, (ii) a radio configuration for the UE, and (iii) at least a portion of an uplink packet from the UE; and in response to the uplink message including the EDT indication, refraining from transmitting, to the UE, a radio configuration received from the DU.

15. The network node of claim 14, wherein the processing hardware is further configured to:

process the at least the portion of the uplink data packet.

16. The network node of claim 15, wherein the processing hardware is further configured to:

discard the radio configuration in response to at least one of: (i) determining that the transfer message includes the uplink message, uplink data, and the radio configuration; or (ii) determining that the uplink message is a request to set up a new radio connection.

17. The network node of claim 16, wherein the processing hardware is further configured to, when the uplink message is a request to resume a radio connection between the UE and the DU:

perform a context setup procedure to obtain, from the DU, the radio configuration for the UE; and discard the radio configuration in response to determining that the transfer message includes the at least the portion of the uplink data packet.

18. The network node of claim 15, wherein the processing hardware is further configured to:

transmit, to the UE via the DU and subsequently to receiving the at least a portion of the uplink data packet, a release command associated with a protocol for controlling radio resources.

19. The network node of claim 15, wherein the uplink message is a request to resume a radio connection between the UE and the DU, and the processing hardware is further configured to:

obtain a UE context for the UE based on the request; and process the at least a portion of the uplink data packet in accordance with the UE context.

* * * * *